United States Patent
Lee et al.

(10) Patent No.: US 11,210,026 B2
(45) Date of Patent: Dec. 28, 2021

(54) DIGITAL DEVICE AND METHOD FOR CONTROLLING THE SAME

(71) Applicant: LG ELECTRONICS INC., Seoul (KR)

(72) Inventors: Gunho Lee, Seoul (KR); Sungho Bae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 2 days.

(21) Appl. No.: 16/759,859

(22) PCT Filed: Feb. 28, 2019

(86) PCT No.: PCT/KR2019/002401
§ 371 (c)(1),
(2) Date: Apr. 28, 2020

(87) PCT Pub. No.: WO2020/175720
PCT Pub. Date: Sep. 3, 2020

(65) Prior Publication Data
US 2021/0216242 A1    Jul. 15, 2021

(51) Int. Cl.
*G06F 12/00* (2006.01)
*G06F 13/00* (2006.01)
(Continued)

(52) U.S. Cl.
CPC .......... *G06F 3/0659* (2013.01); *G06F 3/0608* (2013.01); *G06F 3/0631* (2013.01);
(Continued)

(58) Field of Classification Search
CPC .... G06F 3/0659; G06F 3/0608; G06F 3/0631; G06F 3/0641; G06F 3/0644; G06F 3/0673; H04L 9/3239
(Continued)

(56) References Cited

U.S. PATENT DOCUMENTS 4,421,977 A * 12/1983 Kittredge ................. G07C 9/23
235/101
4,507,744 A * 3/1985 McFiggans ...... G07B 17/00193
361/679.31
(Continued)

FOREIGN PATENT DOCUMENTS

JP      2018-156582      10/2018
KR      10-1475645       12/2014
(Continued)

OTHER PUBLICATIONS

International Search Report dated Nov. 29, 2019 issued in PCT/KR2019/002401.

*Primary Examiner* — Sheng Jen Tsai
(74) *Attorney, Agent, or Firm* — Ked & Associates, LLP

(57) ABSTRACT

Disclosed are a digital device and a method for controlling the same. The digital device includes a first memory, a second memory used as a swap space for page data in the first memory, and a controller that controls the page data to be swapped out and written in the second memory, and controls the page data written in the second memory to be swapped into the first memory, wherein the controller prevents a write operation of the page data into the second memory, based on a state of the second memory associated with write of the page data, and allows a read-only operation of the page data written in the second memory.

20 Claims, 24 Drawing Sheets

(51) Int. Cl.
*G06F 3/06* (2006.01)
*H04L 9/32* (2006.01)

(52) U.S. Cl.
CPC .......... *G06F 3/0641* (2013.01); *G06F 3/0644* (2013.01); *G06F 3/0673* (2013.01); *H04L 9/3239* (2013.01)

(58) Field of Classification Search
USPC ........................................................ 711/154
See application file for complete search history.

(56) References Cited

U.S. PATENT DOCUMENTS

| | | | | |
|---|---|---|---|---|
| 5,265,232 | A * | 11/1993 | Gannon | G06F 12/082 711/124 |
| 5,426,754 | A * | 6/1995 | Grice | G06F 9/3834 711/124 |
| 5,675,833 | A * | 10/1997 | Radko | G11B 19/10 360/69 |
| 6,012,145 | A * | 1/2000 | Mathers | G06F 21/31 711/164 |
| 6,947,171 | B1 * | 9/2005 | Narusawa | B41J 3/44 358/1.13 |
| 9,658,877 | B2 * | 5/2017 | Barwick | G06F 9/461 |
| 2004/0051752 | A1 * | 3/2004 | Asauchi | B41J 2/17546 347/19 |
| 2007/0188290 | A1 * | 8/2007 | Nakasuji | H01H 36/0066 337/1 |
| 2007/0192491 | A1 * | 8/2007 | Saigo | H04L 67/36 709/226 |
| 2008/0163360 | A1 * | 7/2008 | Nishida | G06F 21/575 726/17 |
| 2009/0319731 | A1 * | 12/2009 | Kirihata | G06F 12/0897 711/155 |
| 2010/0153716 | A1 * | 6/2010 | Kirihata | G06F 21/6245 713/165 |
| 2011/0173154 | A1 * | 7/2011 | Chauvet | G06F 16/2343 707/610 |
| 2011/0191535 | A1 * | 8/2011 | Yuasa | G06F 1/32 711/113 |
| 2012/0166524 | A1 * | 6/2012 | Watakabe | G06F 12/1416 709/203 |
| 2012/0246416 | A1 * | 9/2012 | Shiba | G06F 12/14 711/154 |
| 2012/0284453 | A1 | 11/2012 | Hashimoto | |
| 2014/0379695 | A1 * | 12/2014 | Waters | H04L 63/10 707/722 |
| 2015/0106556 | A1 * | 4/2015 | Yu | G06F 13/1694 711/103 |
| 2015/0199138 | A1 * | 7/2015 | Ramachandran | G06F 3/0656 711/103 |
| 2015/0200833 | A1 * | 7/2015 | Cutforth | G06F 3/0647 709/224 |
| 2015/0234673 | A1 * | 8/2015 | Miyazaki | G06F 9/45558 718/1 |
| 2015/0331628 | A1 * | 11/2015 | Lee | G06F 12/1009 711/103 |
| 2015/0347024 | A1 * | 12/2015 | Abali | G06F 3/0631 711/156 |
| 2016/0371496 | A1 * | 12/2016 | Sell | G06F 9/45558 |
| 2017/0083463 | A1 * | 3/2017 | Kachare | G06F 13/4282 |
| 2018/0157590 | A1 * | 6/2018 | Persson | G06F 12/0833 |
| 2018/0275900 | A1 * | 9/2018 | Teranishi | G06F 3/0659 |
| 2018/0275912 | A1 | 9/2018 | Konosu | |
| 2019/0073255 | A1 * | 3/2019 | Sato | G06F 11/3034 |

FOREIGN PATENT DOCUMENTS

| | | |
|---|---|---|
| KR | 10-2015-0133084 | 11/2015 |
| KR | 10-2016-0068481 | 6/2016 |

* cited by examiner

ORIGINAL DATA
(12 SPLIT WRITES)

DEDUPLICATED DATA
(4 SPLIT WRITES)

DEDUPLICATED DATA
(4 SPLIT WRITES)

COMPRESSED DATA
(2 SPLIT WRITES)

COMPRESSED DATA
(2 SPLIT WRITES)

COMPRESSED DATA
(1 CONTINUOUS WRITE)

DIGITAL DEVICE AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2019/002401, filed Feb. 28, 2019, whose entire disclosures are hereby incorporated by reference.

TECHNICAL FIELD

The present invention relates to a digital device, and more particularly, to a digital device and method for controlling the same. Although the present invention is suitable for a wide scope of applications, it is particularly suitable for providing a data swap function between two memories.

BACKGROUND ART

Mobile devices such as a smart phone, a tablet PC, a wearable device and the like are being developed fast as well as standing devices such as a personal computer (PC), a television (TV), a signage and the like. As the digital convergence booms up owing to the developments of mobile devices, a variety of mutual data communications are performed.

As described above, since various smart functions are mounted on a digital device, a volume of software increases so as to raise the use of high-end RAM (random access memory). Thus, the product manufacturing costs are raised.

In a case of the computer, a swap function for backing a portion of a RAM used by an application in an operating system up to a storage device such as a hard disk is used. However, in a case of a product in which a flash memory is embedded, such as an audio video navigation (AVN) system of a vehicle, a smart TV, and a smartphone, it is difficult to apply a swap technology of the PC due to a problem of deterioration of a lifespan of the flash memory.

That is, when the existing swap technology is applied to an embedded device equipped with the flash memory, the lifespan problem may occur due to frequent occurrences of writes.

For example, in a case of a general multi-level cell (MLC) type flash memory, the number of writes for each cell (the lifespan) is about 3,000, so that the current swap technology is widely used only in a PC storage device such as a HDD disk that has no lifespan problem.

In addition, when the existing swap technology is applied to the vehicle using the flash memory, a requirement of life span reliability is more strict in the vehicle.

On the other hand, because the flash memory such as an eMMC or a UFS supports wear-leveling internally, the lifespan problem of the flash memory may be solved by applying a flash memory of a sufficiently large capacity to the existing swap technology. For example, when a component lifespan of an existing eMMC flash memory of 8 GB is 2 years, the lifespan may increase by 16 years when an eMMC flash memory of 64 GB or greater is applied to the existing swap technology. However, as the capacity of the flash memory such as the eMMC or the UFS increases, a product manufacturing cost increases.

In addition, a SSD storage device with which the lifespan reliability is secured may be applied to the existing swap technology, but this also has a problem of increasing a lot of cost.

DISCLOSURE OF THE INVENTION

Technical Tasks

One purpose of the present invention is to provide a digital device and a method for controlling the same that may use a flash memory as a swap space for page data of a RAM in an embedded device.

Another purpose of the present invention is to provide a digital device and a method for controlling the same that may lower a capacity of the RAM using the flash memory as the swap space of the RAM.

Another purpose of the present invention is to provide a digital device and a method for controlling the same that may dramatically improve lifespan deterioration of the flash memory that may occur when using the flash memory as the swap space of the RAM.

Another purpose of the present invention is to provide a digital device and a method for controlling the same that may continuously use the flash memory as the swap space for page data of the RAM even when a problem occurs in the flash memory by allowing only a read-only operation for the page data stored (or written) in the swap space of the flash memory based on a state of the flash memory.

The technical tasks to be solved by the present invention are not limited to the aforementioned tasks, and any other technical tasks not mentioned herein will be clearly understood from the following description by those skilled in the art to which the present invention pertains.

Technical Solution

According to one aspect of the present invention to achieve the above or other purposes, a digital device according to the present invention is characterized of including a first memory, a second memory used as a swap space for page data in the first memory, and a controller that controls the page data to be swapped out and written in the second memory, and controls the page data written in the second memory to be swapped into the first memory, wherein the controller prevents a write operation of the page data into the second memory based on a state of the second memory associated with write of the page data, and allows a read-only operation of the page data written in the second memory.

In addition, the present invention is characterized in that a method for controlling a digital device including a first memory and a second memory used as a swap space of page data stored in the first memory includes swapping the page data out and writing the page data in the second memory when a swap-out request for storing the page data in the first memory into the second memory, swapping the page data written in the second memory into the first memory when a swap-in request of the page data written in the second memory is received, and preventing a write operation of the page data into the second memory and allowing a read-only operation of the page data written in the second memory based on a state of the second memory associated with write of the page data.

The technical solutions that may be obtained in the present invention are not limited to the aforementioned technical solutions, and any other technical solutions not mentioned herein will be clearly understood from the following description by those skilled in the art to which the present invention pertains.

Advantageous Effects

Effects of the present invention are as follows.

According to one of various embodiments of the present invention, as the flash memory may be used as the swap space for the page data of the RAM memory, the capacity of the RAM memory may be lowered, so that the product manufacturing cost may be lowered.

According to another of various embodiments of the present invention, the deterioration of the lifespan of the flash memory that may occur when using the flash memory as the swap space of the RAM memory may be dramatically improved.

According to another of various embodiments of the present invention, the flash memory may be continuously used as the swap space of the page data of the RAM memory by providing only the read-only operation for the page data written in the flash memory depending on the state of the flash memory.

The advantageous effects that may be obtained in the present invention are not limited to the aforementioned advantageous effects, and any other advantageous effects not mentioned herein will be clearly understood from the following description by those skilled in the art to which the present invention pertains.

MODE FOR INVENTION

Description will now be given in detail according to various embodiment(s) for a digital device and data processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first ~', 'second ~' and the like is provided to facilitate the description of the corresponding terminologies only, which is non-limited by such terminologies or ordinal numbers. Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies. Meanwhile, the descriptions disclosed in the present specification and/or drawings correspond to one preferred embodiment of the present invention and are non-limited by the preferred embodiment. And, the scope/extent of the right should be determined through the appended claims.

'Digital device' described in the present specification includes any device capable of performing at least one of transmission, reception, processing and output of contents for example. The digital device can receive the content or information on the content by streaming or download through a server (e.g., a broadcasting station), an external input or the like. In addition, the digital device, which is an audio video navigation (AVN) system of a vehicle, may transmit/receive various vehicle-related information and traveling-related information to/from the vehicle, execute a user content, and transmit/receive the vehicle-related information, traffic-related information, and the traveling-related information to/from an external server through a wired/wireless network.

Figure 2:
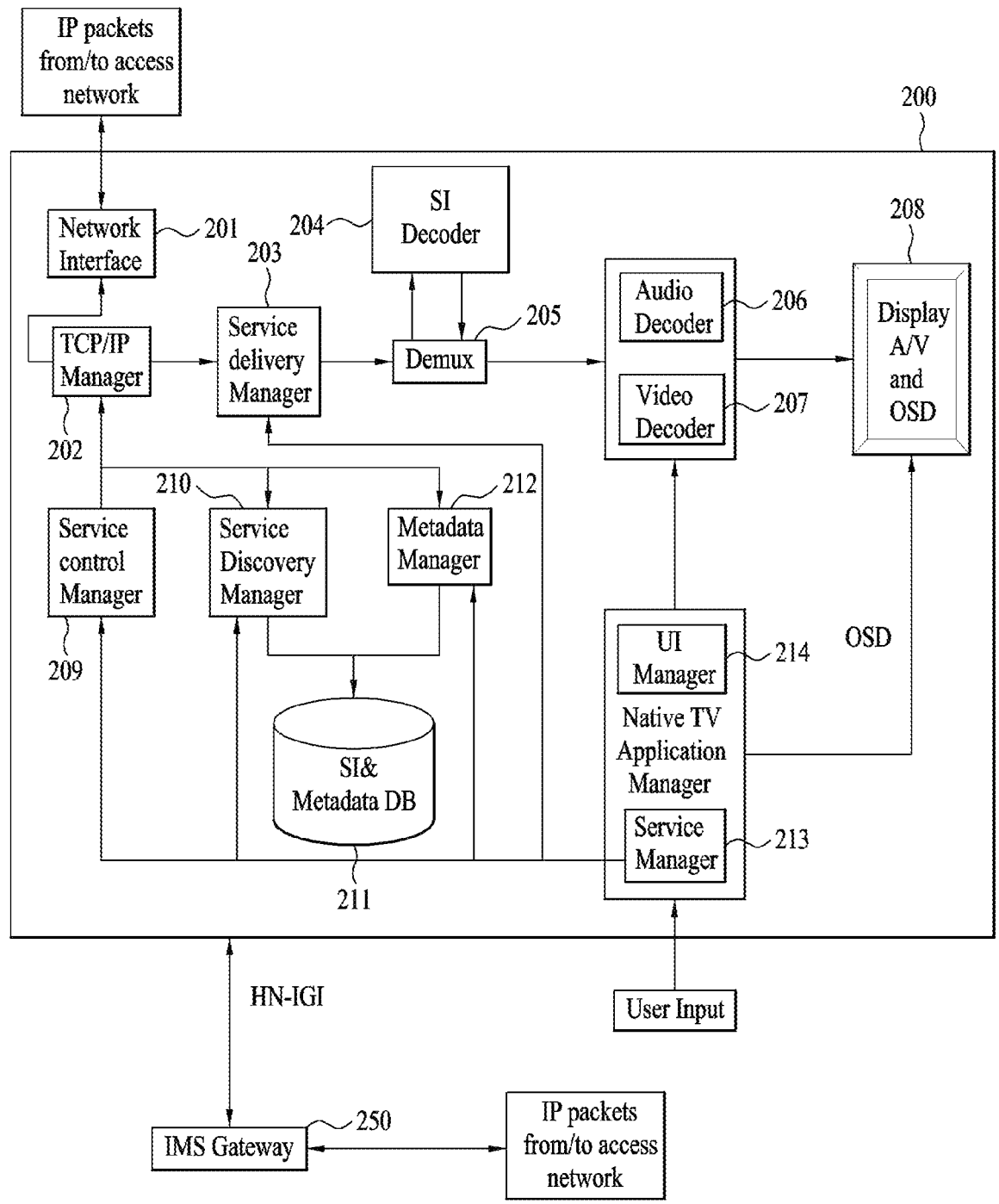
FIG. 2 is a block diagram showing the configuration of a digital TV according to one embodiment of the present invention.
Figure 3A:
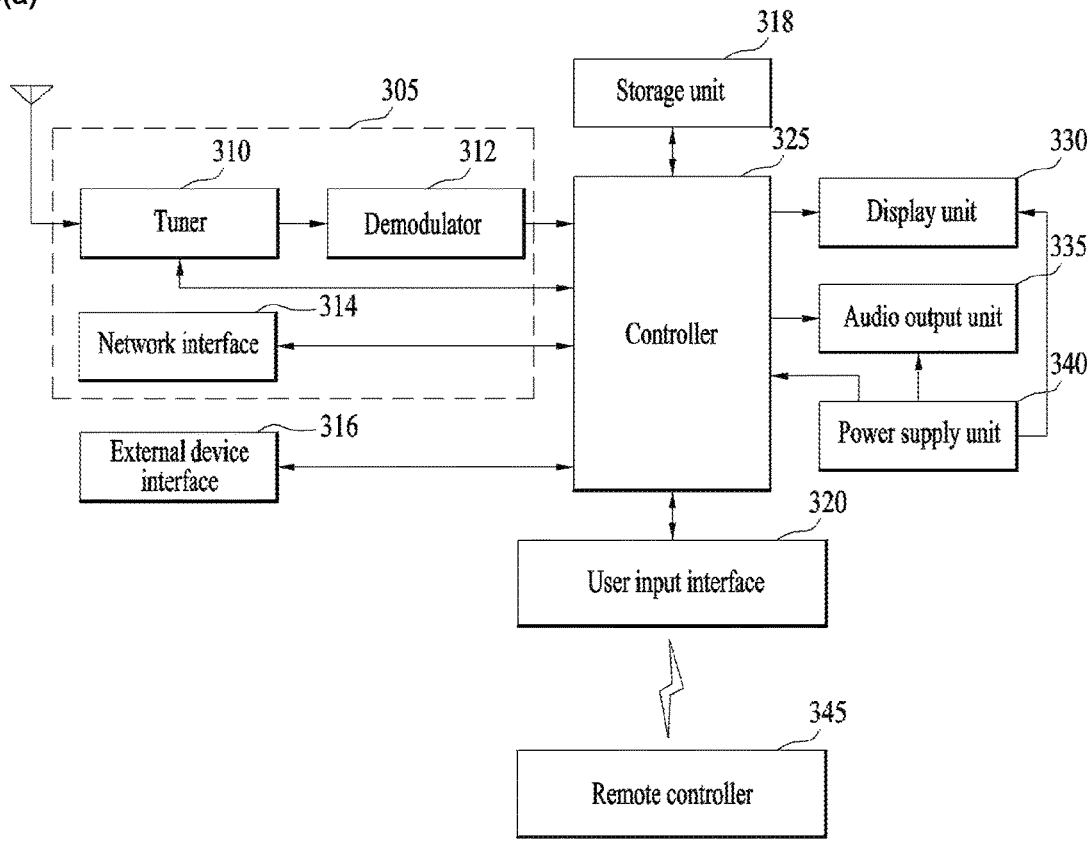
FIGS. 3(a) and 3(b) are block diagrams showing the configuration of a digital TV according to another embodiment of the present invention.

The digital device may transmit/receive data including the content to/from the server or the like through a wire/wireless network. The digital device may include one of a fixed (or standing) device and a mobile device. The standing devices may include Network TV, HBBTV (Hybrid Broadcast Broadband TV), Smart TV, IPTV (Internet Protocol TV), PC (Personal Computer), etc. And, the mobile devices may include PDA (Personal Digital Assistant), Smart Phone, Tablet PC, Notebook, Digital Broadcast Terminal, PMP (portable multimedia player), Navigation, Slate PC, Ultrabook, Wearable Device (e.g., watch type terminal, glass type terminal, HMD (head mounted display), etc. For example of digital devices, FIG. 2 and FIG. 3 show a digital TV as one of the standing devices and FIG. 4 shows a mobile terminal (including a wearable device such as a smart watch) as one of the mobile devices. And, such digital devices shall be described in detail for the corresponding parts. If the digital device is the standing device, it may have include a signage having a display panel only or a SET type with another configuration such as a set-top box (STB) and the like.

In one example, the mobile device, such as the smart phone, may be connected to the vehicle in a wired/wireless communication manner to perform the same role and operation as the AVN system of the vehicle according to the present invention.

Meanwhile, the wire/wireless network described in the present specification includes all hardware and/or software for a connection, pairing, data communication and the like between a server and a digital device, and also includes all networks supported currently or all networks that will be supported in the future, by Standards. The wire/wireless network is capable of supporting one or more communication protocols for data communications. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, a digital device may use a universal OS (operating system), a Web OS and the like. Hence, the digital device can process adding, deleting, amending, updating and the like of various services or applications on Universal OS kernel or Linux kernel, through which a further user-friendly environment can be configured and provided.

Figure 1:
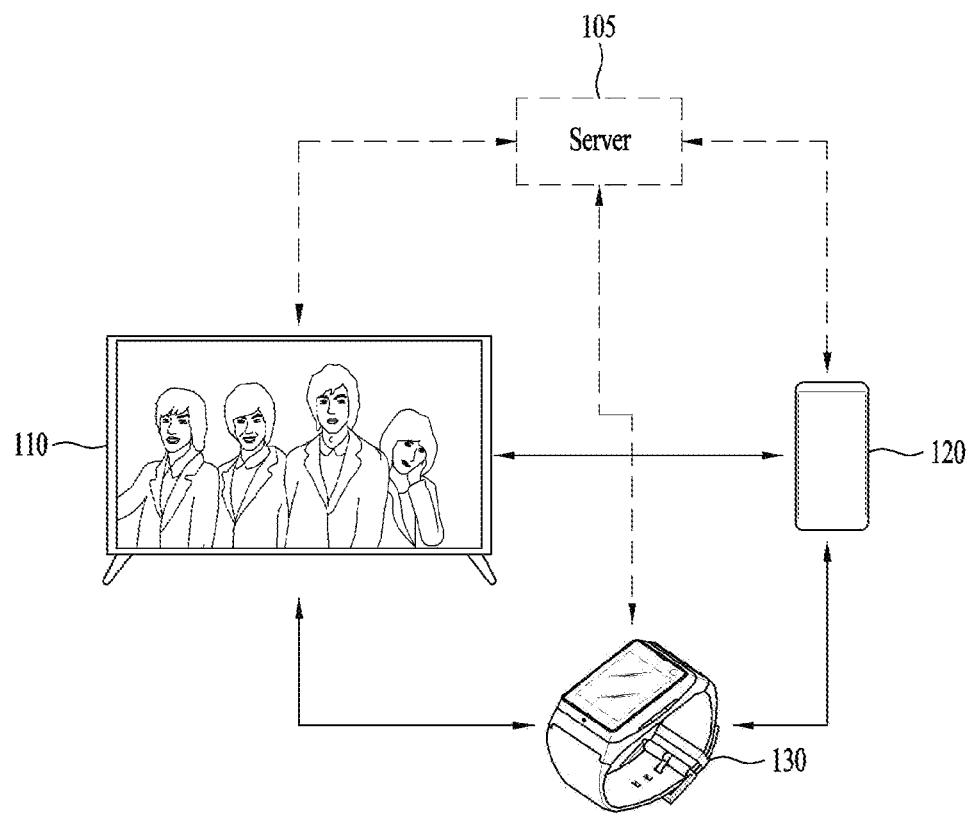
FIG. 1 is a schematic diagram illustrating a service system according to one embodiment of the present invention.

FIG. 1 is a schematic diagram illustrating a service system according to one embodiment of the present invention.

Referring to FIG. 1, a service system may be implemented by including a sever 105 and a digital TV 110. Herein, the digital TV 110 may be substituted with a mobile terminal such as a smartphone 120 or a wearable device 130. Alternatively, the service system may be implemented by including the server 105, the digital TV 110 and the mobile terminals 120 and 130.

FIG. 2 is a block diagram showing the configuration of a digital TV according to one embodiment of the present invention.

The digital TV 200 may include a network interface 201, a TCP/IP manager 202, a service delivery manager 203, an SI decoder 204, a demux or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) to/from the server 105 through a network. For instance, the network interface 201 may receive services, applications, contents and the like from the service provider through a network.

The TCP/IP manager 202 may involve delivery of IP packets transmitted to the digital TV 200 and IP packets transmitted from the digital TV 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (System Information/Service Information/Signaling Information) data and the like and then transmit the demultiplexed data to the audio/video decoder 206/207 and the SI decoder 204, respectively.

The SI decoder 204 may decode the demultiplexed SI data, i.e., service information of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service information to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital TV 200. So to speak, the application manager can administrate the overall states of the digital TV 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212. The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system. The SI & metadata database 211 may be implemented with non-volatile RAM (NVRAM), flash memory and the like.

Meanwhile, an IMS gateway 250 is a gateway in which functions required for an access to an IMS based IPTV service are collected.

FIG. 3 is a block diagram showing a digital TV according to another embodiment of the present invention.

Another example of a digital TV may include a broadcast receiving unit 305, an external device interface 316, a storage unit 318, a user input interface 320, a controller 325, a display unit 330, an audio output unit 335, a power supply unit 340, and a photographing unit (not shown). Herein, the broadcast receiving unit 305 may include at least one of one tuner 310, a demodulator 312, and a network interface 314. Yet, in some cases, the broadcast receiving unit 305 may include the tuner 310 and the demodulator 312 without the network interface 314, or may include the network interface 314 without the tuner 310 and the demodulator 312. The broadcast receiving unit 305 may include a multiplexer (not shown) to multiplex a signal, which is subjected to the tuner 310 and demodulated by the demodulator 312, and a signal received through the network interface 314. In addition, the broadcast receiving unit 305 can include a demultiplexer (not shown) and demultiplex the multiplexed signal, the demodulated signal, or a signal received through the network interface 314.

The tuner 310 may receive a radio frequency (RF) broadcast signal by tuning in to a channel selected by the user or all previously stored channels among RF broadcast signals received through an antenna. And, the tuner 310 converts the received RF broadcast signal into an IF (intermediate frequency) signal or a baseband signal. For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 310 is able to process both of the digital broadcast signal and the analog signal. The analog baseband video/audio signal (CVBS/SIF) outputted from the tuner 310 may be directly inputted to the controller 325. The tuner 310 may receive an RF broadcast signal of a single carrier or multiple carriers. The tuner 310 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 312 receives and demodulates the digital IF signal (DIF) converted by the tuner 310 and is then able to channel decoding and the like. To this end, the demodulator 312 may include a Trellis decoder, a de-interleaver, a Reed-Solomon decoder and the like, or may include a convolution decoder, a de-interleaver, a Reed-Solomon decoder and the like. The demodulator 312 performs demodulation and channel decoding and is then able to output a stream signal TS (transport stream). In this case, the stream signal may include a signal of multiplexing a video signal, an audio signal and/or a data signal. For instance, the stream signal may include MPEG-2 TS (transport stream) in which a video signal of PMEG-2 and an audio signal of Dolby AC-3 are multiplexed. The stream signal outputted from the demodulator 312 may be inputted to the controller 325. The controller 325 can control demultiplexing, audio/video signal processing, etc. Furthermore, the controller 325 can control outputs of video and audio through the display 330 and the audio output unit 335, respectively.

The external device interface 316 may provide an interfacing environment between the digital device 300 and various external devices. To this end, the external device interface 316 may include an A/V input/output unit (not shown) or a wireless communication unit (not shown). The external device interface 316 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 316 delivers a signal containing data such as an image, a video, an audio and the like, which is inputted through the connected external device, to the controller 325 of the digital TV. The controller 325 may control a data signal of the processed image, video and audio and the like to be outputted to the connected external device. To this end, the external device interface 316 may further include an A/V input/output unit (not shown) or a wireless communication unit (not shown).

In order to input video and audio signals of an external device to the digital TV, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital TV may be networked with other digital devices by communication protocols such as Bluetooth, radio frequency identification (RFID), infrared data association (IrDA), ultra wideband (UWB), ZigBee, and digital living network alliance (DLNA), etc. for example.

The external device interface 316 may perform input/output operations with a set-top box (STB) by being connected thereto through at least one of the aforementioned terminals. Meanwhile, the external device interface 316 may receive an application or an application list within an adjacent external device and then forward it to the controller 325 or the storage unit 318.

The network interface 314 may provide an interface for connecting the digital TV to wired/wireless networks including Internet network. The network interface 314 may have Ethernet terminal and the like for an access to a wired network for example. For the access to the wireless network, the network interface 314 may use communication specifications such as WLAN (Wireless LAN) (Wi-Fi), Wibro (Wireless broadband), Wimax (World Interoperability for Microwave Access), HSDPA (High Speed Downlink Packet Access), etc. The network interface 314 may transceive data with another user or another digital device through the accessed network or another network linked to the accessed network. Particularly, the network interface 314 may send a portion of the content data stored in the digital TV to a user/digital device selected from other users/digital devices previously registered at the digital TV. Meanwhile, the network interface 314 may access a prescribed webpage through the accessed network or another network linked to the accessed network. Namely, the network interface 314 accesses a prescribed webpage through a network and is then able to transceive data with a corresponding server. Besides, the network interface 314 can receive contents or data provided by a content provider or a network operator. Namely, the network interface 314 may receive contents (e.g., movie, advertisement, game, VOD, broadcast signal, etc.) provided by the content provider or a network provider and information associated with the contents through the network. The network interface 314 may receive update information and file of firmware provided by the network operator. And, the network interface 314 may send data to the internet or content provider or the network operator. Moreover, the network interface 314 may select a desired application from open applications and receive it through a network.

The storage unit 318 may store programs for various signal processing and controls within the controller 325, and may also store a processed video, audio or data signal. In addition, the storage unit 318 may execute a function of temporarily storing a video, audio or data signal inputted from the external device interface 316 or the network interface 314. The storage unit 318 may store information on a prescribed broadcast channel through a channel memory function. The storage unit 318 may store an application or an application list inputted from the external device interface 316 or the network interface 314. And, the storage unit 318 may store various platforms which will be described later.

The storage unit 318 may include storage media of one or more types, such as a flash memory type, a hard disk type, a multimedia card micro type, a card type memory (e.g. SD or XD memory), RAM, EEPROM, etc. The digital TV may play content files (a video file, a still image file, a music file, a text file, an application file, etc.) stored in the storage unit 318 and provide them to the user. FIG. 3(a) illustrates an embodiment in which the storage unit 318 is separated from the controller 325, by which the present invention is non-limited. In other words, the storage unit 318 may be included in the controller 325.

The user input interface 320 may forward a signal inputted by a user to the controller 325 or forward a signal outputted from the controller 325 to the user. For example, the user input interface 320 may receive control signals for power on/off, channel selection, screen settings and the like from a remote controller 345, or transmit control signals of the controller 325 to the remote controller 345, according to various communication schemes such as RF communication, IR communication, and the like. The user input interface 320 can forward control signals inputted through a power key, a channel key, a volume key, and a local key (not shown) for a setup value or the like to the controller 325. The user input interface 320 may forward a control signal inputted from a sensing unit (not shown) sensing a gesture of a user to the controller 325 or transmit a signal of the controller 325 to the sensing unit (not shown). Here, the sensing unit (not shown) may include a touch sensor, a voice sensor, a location sensor, an action sensor, etc.

The controller 325 may generate and output a signal for a video or audio output by demultiplexing a stream inputted through the tuner 310, the demodulator 312 or the external device interface 316 or processing demultiplexed signals. A video signal processed by the controller 325 can be inputted to the display unit 380 and displayed as an image corresponding to the video signal. In addition, the video signal video-processed by the controller 325 can be inputted to an external output device through the external device interface 316. An audio signal processed by the controller 325 can be audio-outputted to the audio output unit 335. Moreover, the audio signal processed by the controller 325 can be inputted to the external output device through the external device interface 316. The controller 325 may include a demultiplexer, an image processor, and the like, which are not shown in FIG. 3(a). The controller 325 can control the overall operations of the digital TV. For example, the controller 325 can control the tuner 310 to tune in to an RF broadcast corresponding to a channel selected by a user or a previously stored channel. The controller 325 can control the digital TV according to a user command input through the user input interface 320 or an internal program. Particularly, the controller 325 can control the digital TV to access a network to download an application or an application list desired by a user to the digital TV. For example, the controller 325 may control the tuner 310 to receive a signal of a channel selected in response to a prescribed channel selection command received through the user input interface 320. And, the controller 325 may process a video, audio or data signal of the selected channel. The controller 325 may control information on a channel selected by the user to be outputted together with a processed video or audio signal through the display unit 330 or the audio output unit 335. For another example, the controller 325 may control a video signal or an audio signal, which is inputted through the external device interface unit 316 from an external device (e.g., a camera or a camcorder), to be outputted through the display unit 330 or the audio output unit 335 in response to an external device image play command received through the user input interface 320. Meanwhile, the controller 325 can control the display unit 330 to display a video. For example, the controller 325 can control a broadcast video inputted through the tuner 310, an external input video inputted through the external device interface 316, a video inputted through the network interface 430, or a video stored in the storage unit 440 to be displayed on the display unit 330. Here, the video displayed on the display unit 330 may include a still image or moving images or may include a 2D or 3D video. The controller 325 may control a content to be played. Here, the content may include a content stored in the digital TV, a received broadcast content, or a content inputted externally. The content may include at least one of a broadcast video, an external input video, an audio file, a still image, an accessed web screen, and a document file. The controller 325 may control an application or an application list, which is located in the digital device 300 or downloadable from an external network, to be displayed when an application view menu is entered. The controller 325 may control installation and execution of applications downloaded from an external network together with various user interfaces. Moreover, the controller 325 can control a video related to a launched application to be displayed on the display unit 330 by a user's selection.

Meanwhile, a channel browsing processor (not shown) configured to generate a thumbnail image corresponding to a channel signal or an external input signal may be further included. The channel browsing processor may receive an input of a stream signal (TS) outputted from the demodulator 312 or an input of a stream signal outputted from the external device interface 316, extract a video from the inputted stream signal, and then generate a thumbnail image. The generated thumbnail image can be directly inputted to the controller 325 or may be inputted to the controller 325 by being encoded. Moreover, the generated thumbnail image may be encoded into a stream and then inputted to the controller 325. The controller 325 may display a thumbnail list including a plurality of thumbnail images on the display unit 330 using the inputted thumbnail images. The thumbnail images included in the thumbnail list can be updated sequentially or simultaneously. Accordingly, the user can conveniently check content of a plurality of broadcast channels.

The display unit 330 may convert each of a video signal, a data signal, and an OSD signal processed by the controller 325 or each of a video signal and a data signal received from the external device interface 316 into R, G and B signals to generate a drive signals. The display unit 330 may include PDP (Plasma Display Panel), LCD (Liquid Crystal Display), OLED (Organic Light Emitting Diode), a flexible display, a 3D display, or the like. The display unit 330 may be configured as a touchscreen and used as an input device as well as an output device. The audio output unit 335 receives a signal audio-processed by the controller 325, for example, a stereo signal, a 3.1 channel signal or a 5.1 channel signal, and then outputs the received signal as audio. The audio output unit 335 may be configured as one of speakers of various types.

Meanwhile, the digital TV may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 325 through the user input interface 320. The digital TV may further include a photographing unit (not shown) for photographing a user. Image information acquired by the photographing unit (not shown) can be inputted to the controller 325. The controller 325 may sense a gesture of a user from an image captured by the photographing unit (not shown) or a signal sensed by the sensing unit (not shown), or by combining the image and the signal.

The power supply unit 340 may supply a corresponding power to the digital TV overall. Particularly, the power supply unit 340 can supply the power to the controller 325 configurable as a system-on-chip (SoC), the display unit 330 for a video display, and the audio output unit 335 for an audio output. To this end, the power supply unit 340 may include a converter (not shown) configured to convert an AC power to a DC power. Meanwhile, for example, if the display unit 330 is configured as an LCD panel having a multitude of backlight lamps, the power supply unit 340 may further include an inverter (not shown) capable of PWM (pulse width modulation) operation for luminance variation or dimming drive.

The remote controller 345 sends a user input to the user input interface 320. To this end, the remote controller 345 can use Bluetooth, RF communication, IR communication, UWB, ZigBee, etc. In addition, the remote controller 345 can receive audio, video or data signal outputted from the user input interface 320 and then display the received signal or output the same as audio or vibration.

Regarding the digital device according to the present invention, some of the illustrated components may be omitted or new components (not shown) may be further added as required. On the other hand, the digital device may not include the tuner and the demodulator, differently from the aforementioned digital device, and may play content by receiving the content through the network interface or the external device interface.

Figure 3B:
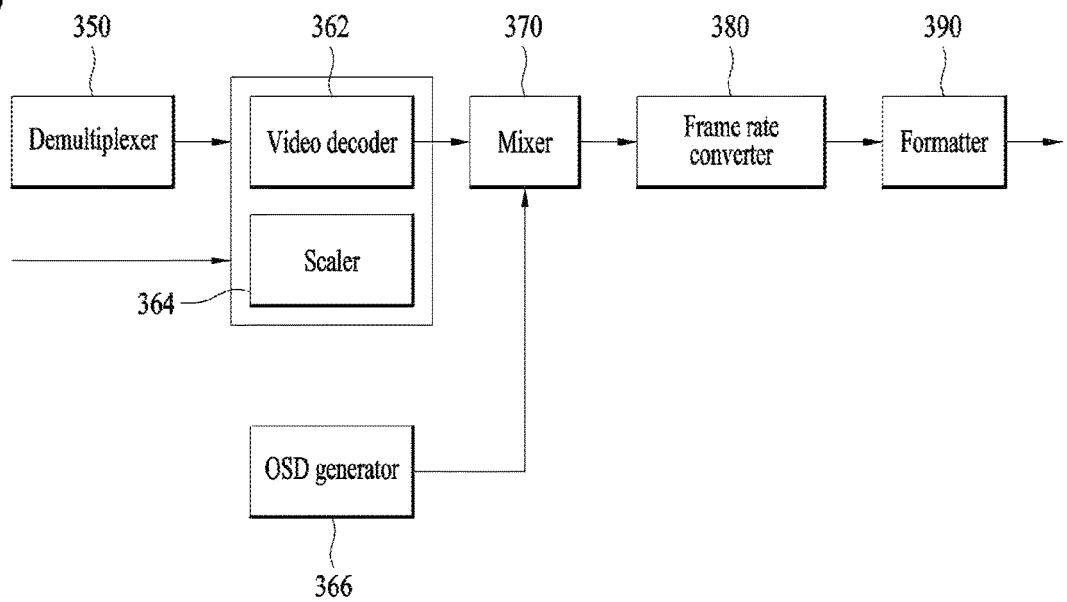
Figure 4:
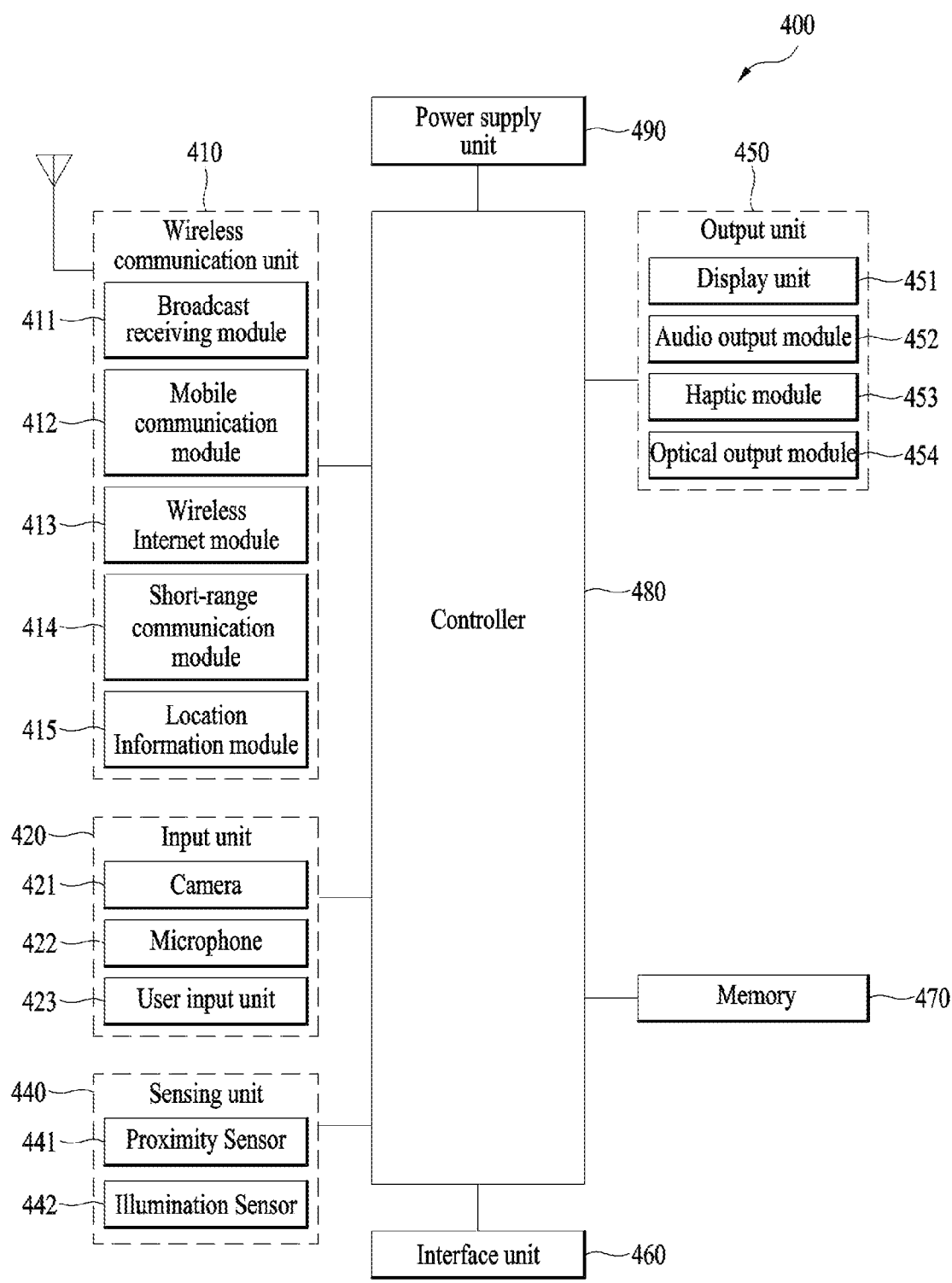
FIG. 4 is a diagram showing the configuration of a mobile terminal according to one embodiment of the present invention.

Referring to FIG. 3(b), one example of the controller may include a demultiplexer 350, a video processor, an OSD generator 366, a mixer 370, a frame rate converter (FRC) 380, and a formatter 390. Besides, the controller may further include an audio processor and a data processor (not shown).

The demultiplexer 350 demultiplexes an inputted stream. For instance, the demultiplexer 350 can demultiplex an inputted stream signal into an MPEG-2 TS video, audio and data signals. Herein, the stream signal inputted to the demultiplexer may include a stream signal outputted from the tuner, demodulator or external device interface.

The video processor performs a video processing of the demultiplexed video signal. To this end, the video processor may include a video decoder 362 and a scaler 364. The video decoder 362 can decode the demultiplexed video signal, and the scaler 364 can scale the resolution of the decoded video signal to be outputtable from the display. The video decoder 362 can support various specifications. For instance, the video decoder 362 performs a function of MPEG-2 decoder if a video signal is encoded by MPEG-2. And, the video decoder 364 performs a function of H.264 decoder if a video signal is encoded by DMB (digital multimedia broadcasting) or H.264. Meanwhile, the video signal decoded by the image processor is inputted to the mixer 370.

The OSD generator 366 may generate OSD data according to a user input or by itself. For example, the OSD generator 366 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 366 can generate data to display a caption of a broadcast video or EPG based broadcast information.

The mixer 370 mixes the OSD data generated by the OSD generator 366 and the video signal processed by the video processor. The mixer 370 then provides the mixed signal to the formatter 390. By mixing the decoded video signal and the OSD data, OSD is displayed in a manner of overlaying a broadcast video or an external input video.

The frame rate converter (FRC) 380 may convert a frame rate of an inputted video. For example, the frame rate converter 380 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 380 can perform the conversion by inserting a first frame between the first frame and a second frame or inserting a third frame predicted from the first and second frames. For another instance, in case of converting a frame rate into 240 Hz from 60 Hz, the frame rate converter 380 can perform the conversion by further inserting three same or predicted frames between the existing frames. Meanwhile, in case of not performing a separate frame conversion, the frame rate converter 380 may be bypassed.

The formatter 390 may change the output of the frame rate converter 380, which is inputted thereto, to fit an output format of the display unit. For example, the formatter 390 can output an RGB data signal. In this case, this RGB data signal can be outputted as low voltage differential signal (LVDS) or mini-LVDS. If an inputted output of the frame rate converter 380 is a 3D video signal, the formatter 390 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal. And, the audio processor (not shown) in the controller can process base, treble, volume adjustment and the like. A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital TV is one example according to the present invention. And, at least one of the components may be integrated, added or omitted depending on options of an actually embodied digital TV. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention. Meanwhile, a digital TV may include an image signal processing device configured to process a signal of an image saved in the corresponding device or a signal of an inputted image. Examples of the image signal processing device may include a set-top box (STB) failing to include the display unit 330 and the audio output unit 335 shown in FIG. 3(*a*), the aforementioned DVD player, a Blu-ray player, a game device, a computer and the like.

FIG. 4 is a block diagram showing the configuration of a mobile terminal according to one embodiment of the present invention.

Referring to FIG. 4, the mobile terminal 400 includes a wireless communication unit 410, an A/V (audio/video) input unit 420, a user input unit 430, a sensing unit 440, an output unit 450, a memory 460, an interface unit 470, a controller 480, a power supply unit 490, etc.

The wireless communication unit 410 typically includes one or more modules which permit wireless communication between the mobile terminal 400 and a wireless communication system or network within which the mobile terminal 400 is located. For instance, the wireless communication unit 410 can include a broadcast receiving module 411, a mobile communication module 412, a wireless Internet module 413, a short-range communication module 414, a location information module 415, etc.

The broadcast receiving module 411 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal. The broadcast associated information may include information associated with a broadcast channel, a broadcast program, or a broadcast service provider. Furthermore, the broadcast associated information can be provided via a mobile communication network. In this case, the broadcast associated information can be received by the mobile communication module 412. The broadcast associated information can be implemented in various forms, e.g., an electronic program guide (EPG), an electronic service guide (ESG), and the like. The broadcast receiving module 411 may be configured to receive digital broadcast signals using broadcasting systems such as ATSC, DVB-T (Digital Video Broadcasting-Terrestrial), DVB-S(Satellite), MediaFLO (Media Forward Link Only), DVB-H (Handheld), ISDB-T (Integrated Services Digital Broadcast-Terrestrial), and the like. Optionally, the broadcast receiving module 411 can be configured to be suitable for other broadcasting systems as well as the above-noted digital broadcasting systems. The broadcast signal and/or broadcast associated information received by the broadcast receiving module 411 may be saved to the memory 460.

The mobile communication module 412 transmits/receives wireless signals to/from at least one of a base station, an external terminal, and a server via a mobile network. Such wireless signals may carry audio signals, video signals, and data of various types according to transceived text/multimedia messages.

The wireless Internet module 413 includes a module for wireless Internet access and may be internally or externally coupled to the mobile terminal 400. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 414 is a module for short-range communications. Suitable technologies for implementing this module include Bluetooth, radio frequency identification (RFID), infrared data association (IrDA), ultra-wideband (UWB), ZigBee, RS-232, RS-385 and the like.

The location information module 415 is a module for obtaining location information of the mobile terminal 100. And, this module may be implemented with a global positioning system (GPS) module for example.

The audio/video (A/V) input unit 420 is configured to provide audio or video signal input. The A/V input unit 420 may include a camera 421, a microphone 422 and the like. The camera 421 receives and processes image frames of still pictures or video, which are obtained by an image sensor in a video call mode or a photographing mode. Furthermore, the processed image frames can be displayed on the display 451.

The image frames processed by the camera 421 can be stored in the memory 460 or transmitted externally via the wireless communication unit 410. Optionally, at least two cameras 421 can be provided according to the environment of usage.

The microphone 422 receives an external audio signal in call mode, recording mode, voice recognition mode, or the like. This audio signal is processed and converted into electrical audio data. The processed audio data is transformed into a format transmittable to a mobile communication base station via the mobile communication module 412 in call mode. The microphone 422 typically includes assorted noise cancelling algorithms to cancel noise generated in the course of receiving the external audio signal.

The user input unit 430 generates input data for a user to control an operation of the terminal. The user input unit 430 may include a keypad, a dome switch, a touchpad (e.g., static pressure/capacitance), a jog wheel, a jog switch, and/or the like.

The sensing unit 440 generates sensing signals for controlling operations of the mobile terminal 400 using status measurements of various aspects of the mobile terminal. For instance, the sensing unit 440 may detect an open/closed status of the mobile terminal 400, a location of the mobile terminal 400, an orientation of the mobile terminal 400, a presence or absence of user contact with the mobile terminal 400, an acceleration/deceleration of the mobile terminal 400, and the like. For example, if the mobile terminal 400 is moved or inclined, it is able to sense a location or inclination of the mobile device. Moreover, the sensing unit 440 may sense a presence or absence of power provided by the power supply unit 490, a presence or absence of a coupling or other connection between the interface unit 470 and an external device, and the like. Meanwhile, the sensing unit 440 may include a proximity sensor 441 such as NFC (near field communication) and the like.

The output unit 450 generates output relevant to the senses of vision, hearing and touch, and may include the display 451, an audio output module 452, an alarm unit 453, a haptic module 454, and the like.

The display 451 is typically implemented to visually display (output) information processed by the mobile terminal 400. For instance, if the mobile terminal is operating in phone call mode, the display will generally provide a user interface (UI) or graphical user interface (GUI) related to a phone call. For another instance, if the mobile terminal 400 is in video call mode or photographing mode, the display 451 may display photographed or/and received images or UI/GUI.

The display module 451 may include at least one of a liquid crystal display (LCD), a thin film transistor-liquid crystal display (TFT-LCD), an organic light-emitting diode display (OLED), a flexible display and a three-dimensional display.

Some of the displays can be implemented in a transparent or optical transmittive type, which can be called a transparent display. A representative example of the transparent display is the TOLED (transparent OLED). A rear configuration of the display 451 can be implemented as the optical transmittive type as well. In this configuration, a user may be able to see an object located in rear of a terminal body through a region occupied by the display 451 of the terminal body.

Two or more displays 451 can be provided to the mobile terminal 400 in accordance with an implementation type of the mobile terminal 400. For instance, a plurality of displays can be disposed on the mobile terminal 400 in a manner of being spaced apart from a single face or being integrally formed on a single face. Alternatively, a plurality of displays may be disposed on different faces of the mobile terminal 400, respectively.

If the display 451 and a sensor (hereinafter called 'touch sensor') for detecting a touch action configure a mutual layer structure, the display 451 is usable as an input device as well as an output device. In this case, the touch sensor can be configured with a touch film, a touch sheet, a touchpad, or the like.

The touch sensor can be configured to convert a pressure applied to a specific portion of the display 451 or a variation of capacitance generated from a specific portion of the display 451 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 480. Therefore, the controller 480 is able to know whether a prescribed portion of the display 451 is touched.

A proximity sensor 441 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 452 functions in various modes including a call-receiving mode, a call-placing mode, a recording mode, a voice recognition mode, and a broadcast reception mode to output audio data which is received from the wireless communication unit 410 or stored in the memory 460. During operation, the audio output module 452 may output an audio signal related to a function (e.g., call received, message received) executed in the mobile terminal 400. The audio output module 452 may include a receiver, a speaker, a buzzer and the like.

The alarm unit 453 outputs a signal for announcing the occurrence of an event of the mobile terminal 400. Typical events occurring in the mobile device may include a call signal received, a message received, a touch input received, and the like. The alarm unit 453 may output a signal for announcing the event occurrence by way of vibration as well as video or audio signal. The video or audio signal can be outputted via the display 451 or the audio output module 452. Hence, the display 451 or the audio output module 452 can be sorted into a part of the alarm unit 453.

The haptic module 454 generates various tactile effects that can be sensed by a user. Vibration is a representative one of the tactile effects generated by the haptic module 454. The strength and pattern of the vibration generated by the haptic module 454 are controllable. For instance, different vibrations can be output in a manner of being synthesized together or can be output in sequence. The haptic module 454 is able to generate various tactile effects as well as the vibration. For instance, the haptic module 454 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 can be implemented to enable a user to sense the tactile effect through a muscle sense of a finger or an arm as well as to transfer the tactile effect through direct contact. Optionally, two or more haptic modules 454 can be provided to the mobile terminal 400 in accordance with a configuration type of the mobile terminal 400.

The memory 460 may store a program for an operation of the controller 480, or may temporarily store inputted/outputted data (e.g., phonebook, message, still image, video, etc.). And, the memory 460 may store data of vibrations and sounds of various patterns outputted in response to a touch input to the touchscreen.

The memory 460 may be implemented using any type or combination of suitable volatile and non-volatile memory or storage devices, including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 400 is able to operate in association with the web storage for performing a storage function of the memory 460 on the Internet.

The interface unit 470 may play a role as a passage to every external device connected to the mobile terminal 400 with external devices. The interface unit 470 receives data from the external devices, delivers a supplied power to the respective elements of the mobile terminal 400, or enables data within the mobile terminal 400 to be transferred to the external devices. For instance, the interface unit 470 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile terminal 400 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile terminal 400 through a port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals inputted from the cradle or the power can operate as a signal for recognizing that the mobile terminal 400 is correctly installed in the cradle.

The controller 480 typically controls the overall operations of the mobile terminal 400. For example, the controller 480 performs the control and processing associated with voice calls, data communications, video calls, and the like. The controller 480 may include a multimedia module 481 that provides multimedia playback. The multimedia module 481 may be configured as a part of the controller 480, or implemented as a separate component. Moreover, the controller 480 is able to perform a pattern recognition processing for recognizing a writing input and a picture drawing input performed on the touchscreen as a text and an image, respectively.

The power supply unit 490 is supplied with an external or internal power and then supplies a power required for an operation of each component, under the control of the controller 480.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 480.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 460, and executed by a controller or processor, such as the controller 480.

Meanwhile, beyond the dimension of user's hand-held use, a wearable device wearable on a body may operate or function as a digital device or an external device in the present specification. Such wearable devices may include a smart watch, smart glasses, an HMD and the like.

As shown in FIG. 1, a wearable device may exchange data with or interwork with another device mutually. The short-communication module 414 may detect (or recognize) a communication enabled wearable device around. If the detected wearable device is a device authenticated to communicate with the mobile terminal 400, the controller 480 may send at least one portion of data processed in the mobile terminal 400 to the wearable device. Hence, a user can use the data processed in the mobile terminal 400 through the wearable device. For instance, if an incoming call is received by the mobile terminal 400, a phone call is performed through the wearable device. If a message is received by the mobile terminal 400, the received message can be checked through the wearable device.

Figure 5:
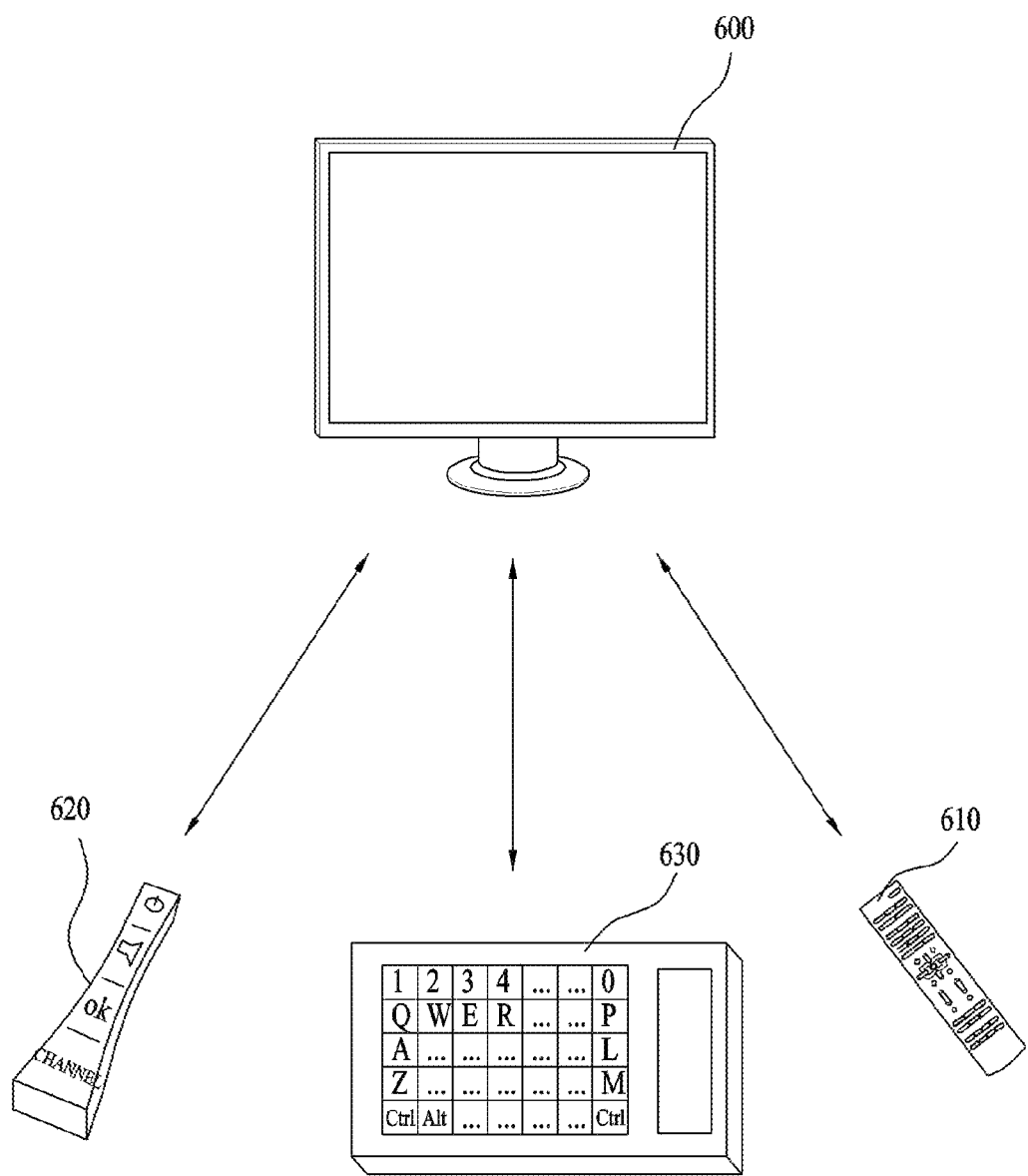
FIG. 5 is a diagram showing control means for controlling a digital device according to one embodiment of the present invention.

FIG. 5 is a diagram showing a control means for controlling a digital device according to one embodiment of the present invention.

In order to control a digital device 500, a front panel (not shown in the drawing) or a control means (e.g., an input means) installed in the digital device 500 is used.

Meanwhile, as a user interface device (UID) capable of a wire/wireless communication, the control means includes a remote controller 510, a pointing device 520, a key board 530, a touchpad, or the like, mainly embodied for the purpose of controlling the digital device 500. And, an external device such as the mobile terminal 120/130 shown in FIG. 1, which is connected or connectible to the digital device 500, may be included in the control means. Meanwhile, in the above description, the mobile terminal 120/130 may control the digital device using an application installed by being downloaded from or through an external server (e.g., the server 105 of FIG. 1 inclusive).

The input means can communicate with the digital device by employing at least one of communication protocols as necessary. In this case, the communication protocols may include Bluetooth, RFID (Radio Frequency Identification), IrDA (infrared Data Association), UWB (Ultra Wideband), ZigBee, DLNA (Digital Living Network Alliance), RS, LTE and the like.

Figure 6:
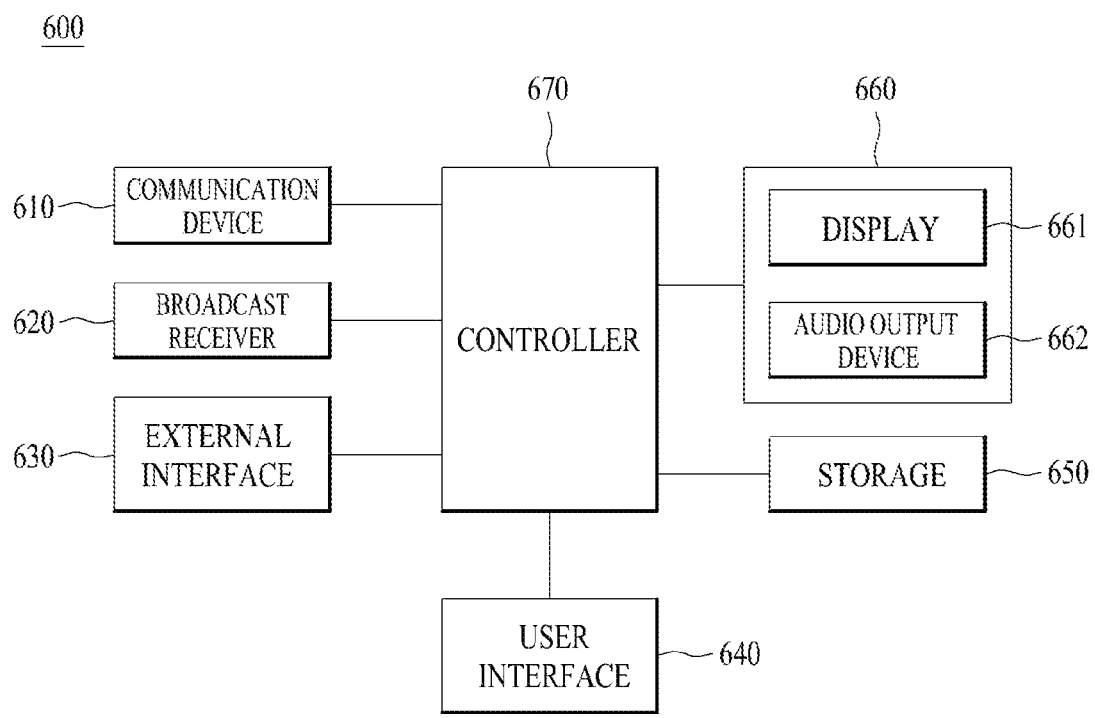
FIG. 6 is a block diagram of a configuration of a vehicle AVN system according to another embodiment of the present invention.

FIG. 6 is a block diagram of a configuration of a vehicle AVN system according to another embodiment of the present invention.

Referring to FIG. 6, an AVN system 600 may include a communication device 610, a broadcast receiver 620, an external interface 630, a user interface 640, storage 650, an output device 660, and a controller 670.

The communication device 610 may transmit/receive the various vehicle-related information, traveling-related information, and traffic-related information to/from the vehicle or an external telematics server associated with the vehicle.

Such communication device 610 may transmit/receive the vehicle-related information to/from the vehicle or the external telematics server using at least one of a CAN communication, a mobile communication, a wireless Internet communication, and a short-range communication. in addition, the communication device 610 may further include a GPS module for obtaining location information of the vehicle.

The broadcast receiver 620 may receive a DMB broadcast signal, DMB broadcast-related information, and a radio broadcast signal from an external broadcast management server through a broadcast channel, decode the same, and output the same through the output device 660.

The external interface 630 provides an interfacing environment between the AVN system 600 and various external devices. to this end, the external interface 630 may include an a/v input/output device (not shown) or a wireless communication device (not shown). the external interface 630 may be wiredly/wirelessly coupled to the external device and the like such as a digital versatile disk (DVD), a Blu-ray, a game device, a camera, a camcorder, a computer (a laptop), a tablet pc, a smartphone, a Bluetooth device, a cloud, a flash memory, and the like. the external interface 630 may output a signal including data, such as an image, a video, and an audio input through the connected external device through the output device 660 under control of the controller 670.

In one example, the flash memory used as a swap space of page data of a RAM memory according to the present invention may be connected to the vehicle AVN system 600 through the external interface 630.

The user interface 640 transmits a signal input by a user to the controller 670 or a signal from the controller 670 to the user. For example, the user interface 640 may include a hardware key button for executing and controlling various functions of the AVN system 600, or a touch screen form for inputting a user touch manipulation together with a display 661 to be described later.

The storage 650 may store a program for processing and controlling each signal in the controller 670, or may store signal-processed video, audio, or data signal. Further, the storage 670 may perform a function for temporarily storing the image, the audio, or the data signal received from the external interface 630 or the communication device 610.

In addition, the storage 650 may include the RAM memory according to the present invention, and may include the flash memory used as the swap space of the page data of the RAM memory in some cases.

The output device 660 may include the display 661 that visually displays various vehicle-related information, vehicle traveling-related information, traffic information, user content, and route guidance information, and the like provided by the AVN system 600, and an audio output device 662 for auditory output.

The controller 670 may control an overall operation of the AVN system 600 according to the present invention, control all operations associated with a swap function between the RAM memory and the flash memory to be described later, and perform all operations through internal modules.

Hereinafter, various embodiment(s) about a data swap process between first and second memories in a digital device according to the present invention will be described in more detail with reference to the accompanying drawings.

A first memory 810 according to the present invention, which is a random access memory (RAM), may be included in the storage unit 318 of the digital tv in FIG. 3, in the memory 460 of the mobile terminal in FIG. 4, or in the storage 650 in FIG. 6.

In addition, a second memory 820 according to the present invention, which is a memory used as a swap space of page data stored in the RAM 810, includes a flash memory. The flash memory may be included in the storage unit 318 of the digital tv in FIG. 3, in the memory 460 of the mobile terminal in FIG. 4, or in the storage 650 of the AVN system 600 in FIG. 6.

In addition, a controller 830 of the digital device according to the present invention may control overall operations of swap-out and swap-in between the RAM 810 and the flash memory 820. A detailed description related to the swap will be described in detail below.

In one example, the swap-out in the present invention means an operation in which the page data of the RAM 810 is stored or written in the flash memory 820, and the swap-in means an operation in which the page data written or stored in the flash memory 820 is moved back to original locations thereof of the RAM 810 and stored or written in the RAM 810. In addition, the page data means a memory management unit of a specific size (e.g., 4 kbytes) in the RAM 810.

Such controller 830 of the digital device according to the present invention may be operated in a form of a module or software in the controller 325 of the digital tv in FIG. 3, or the controller 325 of the digital tv may perform the same operation as the controller 830 of the digital device according to the present invention.

In addition, such controller 830 of the digital device according to the present invention may be operated in the form of the module or the software in the controller 480 of the mobile terminal in FIG. 4, or the controller 480 of the mobile terminal may perform the same operation as the controller 830 of the digital device according to the present invention.

In addition, such controller 830 of the digital device according to the present invention may be operated in the form of the module or the software in the controller 670 of the AVN system in FIG. 6, or the controller 670 of the AVN system may perform the same operation as the controller 830 of the digital device according to the present invention.

Figure 7A:
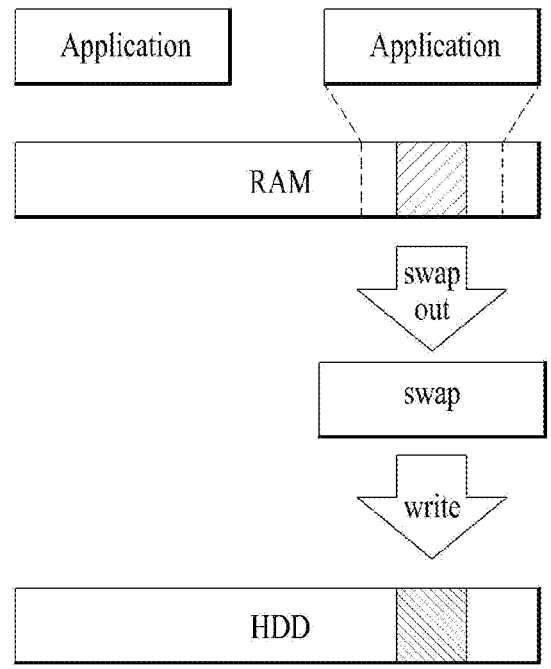
FIGS. 7(a) and 7(b) are explanatory diagrams shown for describing an existing hard disk-based swap technology and a flash memory-based swap technology according to the present invention.
Figure 7B:
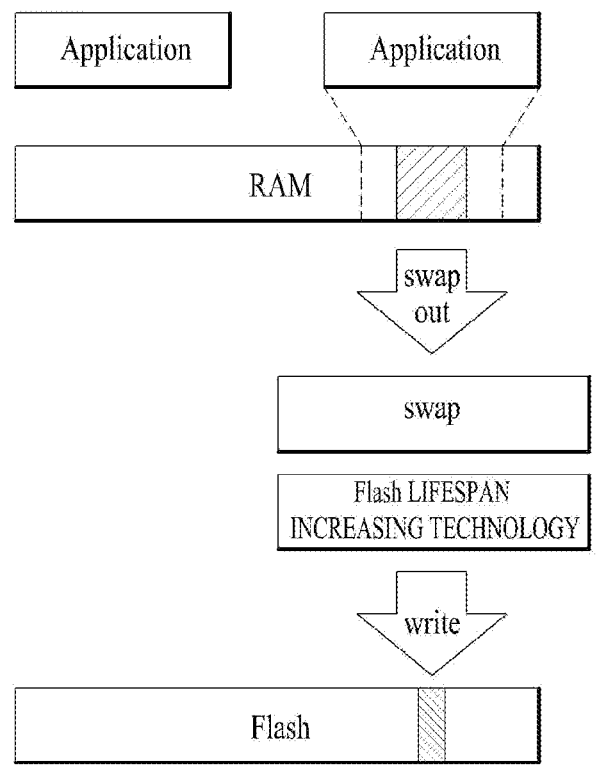

FIG. 7 is an explanatory diagram shown for describing an existing hard disk-based swap technology and a flash memory-based swap technology according to the present invention.

As shown in (a) in FIG. 7, in an existing swap technology, when using the flash memory, the number of writes for each cell (a lifespan) is about 3,000 times. As a result, when a large amount of data is swapped a large number of times in an insufficient memory environment, a problem in that the lifespan of the flash memory is shortened may occur.

In this regard, as shown in (b) in FIG. 7, the present invention uses the flash memory as the swap space for the RAM, and performs following 3 operations to improve the lifespan of the flash memory. Accordingly, as the flash memory may be used as the swap space for the RAM, a RAM capacity compared to a capacity of the flash memory may be lowered.

① In the present invention, when the page data in the RAM is swapped out to the flash memory, only one of page data whose contents are the same and duplicated is swapped out as a representative, so that the number of writes of the flash memory may be primarily reduced, thereby increasing the lifespan.

② Compression is performed on deduplicated page data to secondarily reduce the number of writes of the flash memory, thereby increasing the lifespan.

③ The page data deduplicated and compressed by the processes of ① and ② are not be directly written in the flash memory. In order to reduce the number of writes of page data associated with shortening of the lifespan of the flash memory, the page data are swapped out to the flash memory after being buffered until the page data have a size equal to or greater than a minimum size capable of being input/output into/from the flash memory. Thus, the number of writes of the flash memory may be tertiarily reduced, thereby increasing the lifespan.

In a following description, a function of increasing the lifespan of the flash memory by reducing the number of writes of the flash memory based on the above operations ①, ②, and ③ will be described as "enhanced flash memory swap (EFS)".

In one example, even when the lifespan of the flash memory is improved through the EFS operation, a problem in that the lifespan runs out slowly may occur because of characteristics of the flash memory.

In particular, when an error occurs because of the lifespan problem of the flash memory when applying the EFS function to the AVN system associated with a safety of a vehicle driver, a safety accident and the like may occur, so that higher lifespan reliability is required.

Accordingly, in the present invention, based on the state of the flash memory, a write operation of the page data of the RAM to the flash memory is prevented and only a read-only operation for the page data stored (or written) in the swap space of the flash memory is allowed, so that the flash memory may be continuously used as the swap space of the page data of the RAM even when a problem occurs in the flash memory.

In the following description, an operation of preventing the write operation of the page data of the RAM to the flash memory and allowing only the read-only operation for the page data stored (or written) in the swap space of the flash memory based on the state of the flash memory will be referred to as "EFS Read-only" and described.

First, with reference to FIGS. 8 to 16, an EFS swap-out operation process according to the present invention will be described in detail.

Figure 8:
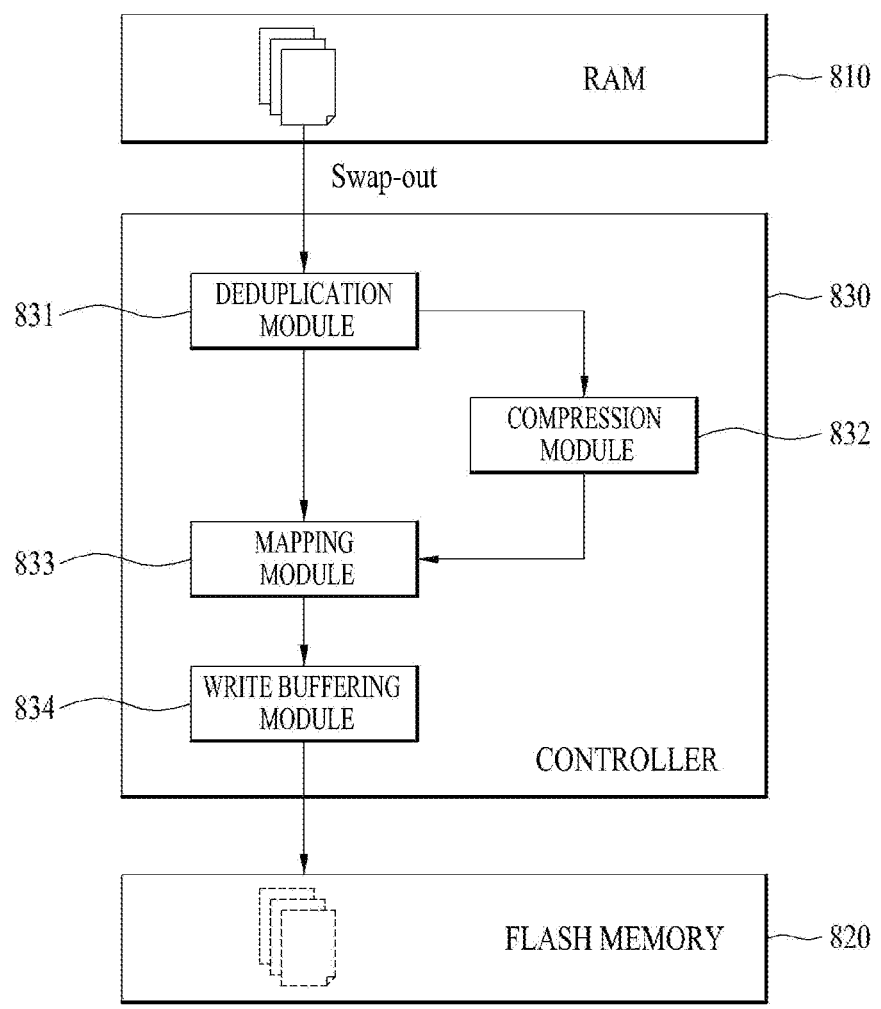
FIG. 8 is a block diagram of a configuration of a digital device performing an EFS swap operation according to the present invention.

First, FIG. 8 is a block diagram of a configuration of a digital device performing an EFS swap operation according to the present invention.

Referring to FIG. 8, the controller 830 controls the swap-out and the swap-in operations of the EFS between the RAM 810 and the flash memory 820.

In this connection, when swapping the page data in the RAM 810 out to the flash memory 820, the controller 730 may swap out only one of two or more page data whose contents are duplicated among the page data to be swapped out as a representative, write (store) the only one page data in the flash memory 820, and remove at least one page data whose content is duplicated.

That is, the controller 830 may calculate distinct values for distinguishing the contents of the page data to be swapped out, and determine that contents of two or more page data having the same distinct value among the calculated distinct values overlap are duplicated.

In addition, the distinct values include hash values calculated by applying a preset hash function to the contents of the page data to be swapped out, and the hash value may be calculated using an entirety or a portion of the contents of the page data to be swapped out.

In addition, the controller 830 may store swap information about the at least one page data removed without being swapped out to the flash memory 820 among the page data whose contents are duplicated, restore the removed at least one page data using the swap information stored in the RAM

810 when swapping the page data swapped out to the flash memory 820 again into an original location thereof in the RAM 810, and swap the page data swapped out to the flash memory 820 and the restored at least one page data into the RAM 810.

That is, the swap information is formed in a form of a mapping table stored in the RAM 810. The controller 830 sequentially maps each hash value of each of the page data to be swapped out and each storage location in the RAM 810 of each page data to be swapped out into the second memory with each swap-offset value indicating an original location of each of the page data to be swapped out from the RAM 810, thereby recording the mapping table. The controller 830 connects a swap-offset value of first page data to a storage location of second page data in the mapping table when a hash value of the first page data is the same as a hash value of the second page data already recorded in the mapping table while performing the mapping operation.

In this connection, the swap information includes the storage location of the second page data connected with the swap-offset value of the first page data. When the first page data that is removed because of not being written in the flash memory 820 is swapped back into the RAM 810, the controller 830 may search for the storage location of the second page data connected with the swap-offset value of the first page data in the mapping table, change the second page data stored at the searched storage location into the first page data, and swap the first page data into the RAM 810.

In addition, the controller 830 may sequentially compress, in a preset compression scheme, page data whose contents are not duplicated among the page data to be swapped out, respectively allocate, to the compressed page data, storage spaces respectively having compressed sizes of the respective page data whose contents are not duplicated in the flash memory 820 with reference to the mapping table, connect each location of each allocated storage space to each swap-offset value and each identification value of each of the page data whose contents are not duplicated.

Thereafter, the controller 830 may buffer the sequentially compressed page data until a total size thereof becomes equal to or greater than the minimum size capable of being input/output into/from the flash memory 820, and finally swap out the buffered page data and write (store) the swapped out page data in the flash memory 820 when a total size of the buffered page data is equal to or greater than the minimum size capable of being input/output into/from the flash memory 820.

The EFS swap-out operation of the controller 830 as described above may be performed by a deduplication module 831, a compression module 832, a mapping module 833, and a write buffering module 834 included in the controller 830.

In this connection, operations of the deduplication module 831, the compression module 832, the mapping module 833, and the write buffering module 834 as described below may be performed by the controller 830 in a form of software in the same manner or may be performed in a form of a hardware block under control of the controller 830.

First, with reference to FIGS. 9 to 11, a process of deduplication of the page data to be swapped out of the deduplication module 831 will be described in detail.

Figure 9:
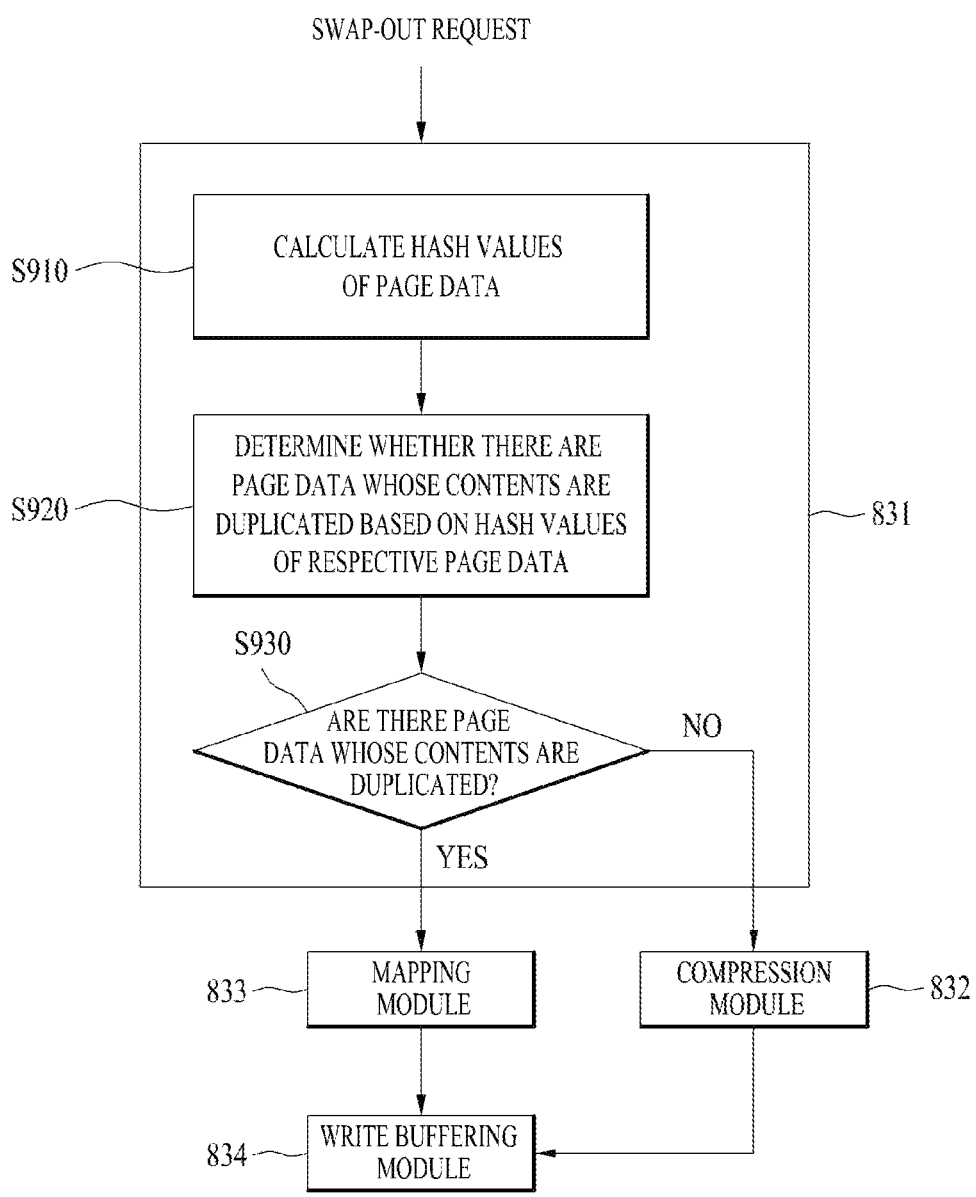
FIG. 9 is a flowchart showing an operation process of a deduplication module according to the present invention.

FIG. 9 is a flowchart showing an operation process of a deduplication module according to the present invention.

Figure 10:
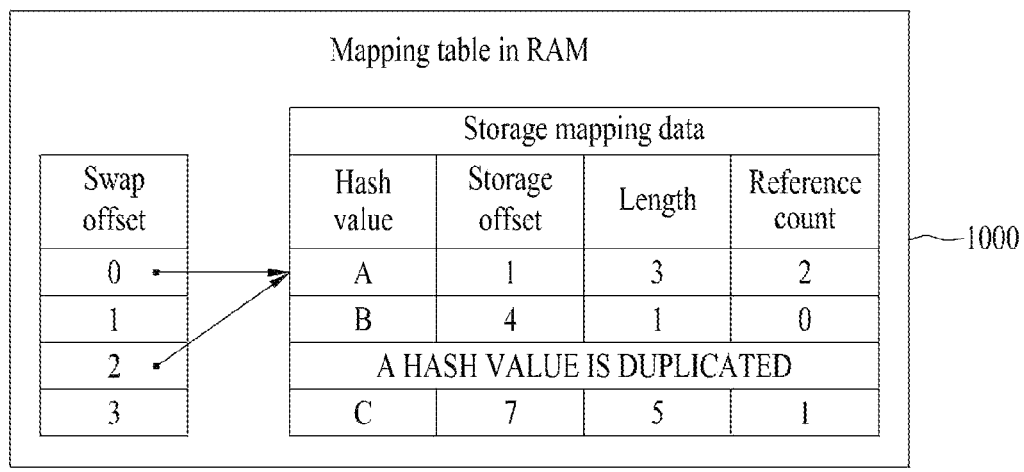
FIG. 10 is a view illustrating a mapping table used for determining whether page data are duplicated according to the present invention.

FIG. 10 is a view illustrating a mapping table used for determining whether page data are duplicated according to the present invention.

Figure 11A:
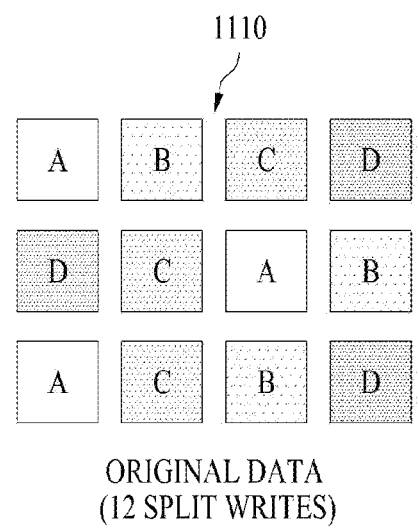
FIGS. 11(a) and 11(b) are explanatory diagrams for describing a process of deduplicating page data to be swap outed according to the present invention.
Figure 11B:
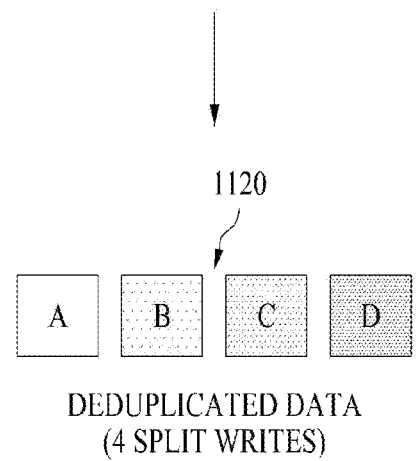

FIG. 11 is an explanatory diagram for describing a process of deduplicating page data to be swap outed according to the present invention.

With reference to FIGS. 9 to 11, when a request for swapping the page data in the RAM 810 out to the flash memory 820 is received, the deduplication module 831 calculates hash values for distinguishing the contents of the page data to be swapped out under the control of the controller 830 before swapping the page data out into the flash memory 820 [S910].

In this connection, the hash values may be calculated with at least one cryptographic hash function of a message-digest algorithm 5 (MD5) and a secure hash algorithm (SHA) that create a 128-bit hash value, and the hash function may be calculated by being implemented as the software or the hardware block (deduplication module).

When the hash values of the respective page data to be swapped out are calculated, the deduplication module 831 may determine that contents of two or more page data having the same hash value among the calculated hash values are duplicated.

In this connection, whether the page data to be swapped out are duplicated may be determined using a mapping table 1000 disclosed in FIG. 10 below.

Figure 14:
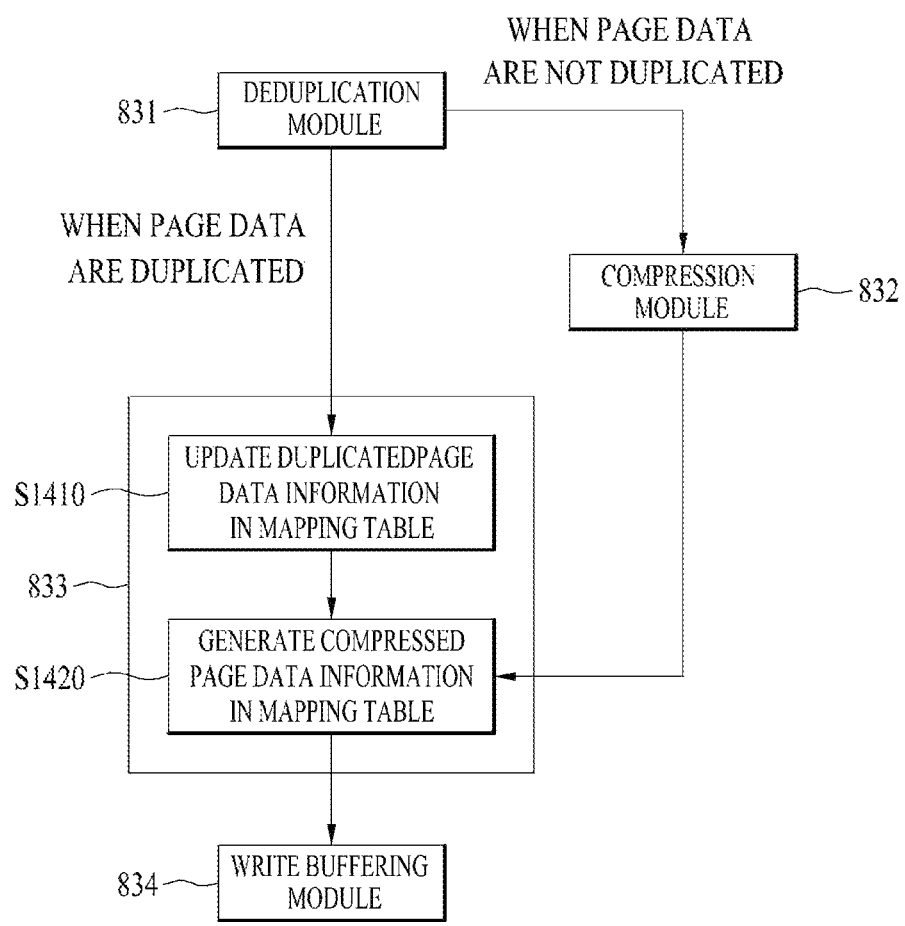
FIG. 14 is a flowchart showing an operation process of a mapping module according to the present invention.

Storage mapping data for each page data including at least one of the hash value of each page data, the location (a storage offset) of the storage space of each page data to be swapped out to the flash memory 820, a size (a length) of data of each page data, and the number of duplicates (a reference count) of each page data is recorded in the mapping table 1000 illustrated in FIG. 10 by the mapping module 833 to be described in FIG. 14.

As shown in FIG. 10, a description will be achieved by assuming that swap-out of first to fourth page data respectively having swap-offset values respectively indicating original storage locations thereof in the RAM 810 of "0" to "3" is requested. When a hash value equal to a hash value "A" of the first page data having a "0" swap-offset value is not recorded in the mapping table 1000, the deduplication module 831 determines that the first page data is page data that is not currently duplicated.

In one example, as first storage mapping data of the first page data, the hash value "A", a storage location "1", a data size "3", and the number of duplicates "2" are recorded in the mapping table 1000 by the mapping module 833 to be described later in FIG. 14 below.

In this connection, the number of duplicates "1" represents that corresponding page data is not duplicated. For example, the number of duplicates "2" represents that there is one page data that has the same content as the corresponding page data. In addition, the number of duplicates "3" represents that there are two page data that have the same content as the corresponding page data. The number of duplicates "0" represents a state in which a process corresponding to the corresponding page data is terminated and the corresponding page data is not used in the actual RAM 810.

Next, when a hash value equal to a hash value "B" of the second page data having a swap-offset value "1" is not recorded in the mapping table 1000, the deduplication module 831 determines that the second page data is page data that is not currently duplicated.

In one example, as second storage mapping data of the second page data, the hash value "B", a storage location "4", a data size "1", and the number of duplicates "0" are recorded in the mapping table 1000 by the mapping module 833 to be described later in FIG. 14 below.

However, when the hash value A equal to the hash value "A" of the third page data having a swap-offset value "2" is not recorded in the mapping table 1000, the deduplication module 831 determines that the third page data is page data that is duplicated with the first page data described above.

Further, when a hash value equal to a hash value "C" of the fourth page data having a swap-offset value "3" is not recorded in the mapping table 1000, the deduplication module 831 determines that the fourth page data is page data that is not currently duplicated. As fourth storage mapping data of the fourth page data, the hash value "C", a storage location "7", a data size "5", and the number of duplicates "1" are recorded in the mapping table 1000 by the mapping module 833 to be described later in FIG. 14 below.

As described above, based on each hash value and mapping table 1000 of the page data to be swapped out, the deduplication module 831 determines whether there are the first and third page data whose contents are duplicated among the page data to be swapped out based on the hash values of the respective page data to be swapped out and the mapping table 1000 [S920].

Further, as shown in FIG. 10, when there are the first and third page data whose contents are duplicated among the page data to be swapped out [S930], the deduplication module 831 may transmit the first page data, which is firstly compared with the mapping table 1000, and the second and fourth page data that are not duplicated among the duplicated page data to the compression module 832, transmit swap information for the third page data excluding the first page data among the duplicated page data to the mapping module 833, and delete the third page data while leaving the first page data transmitted to the compression module 832 among the duplicated first and third page data.

In this connection, the swap information for restoring the deleted third page data and swapping the third page data again into the RAM 810 may include the swap-offset value of the third page data and the first storage mapping data of the first page data duplicated with the third page data.

In addition, in the previous description, it has been described that the duplicated third page data is removed by the deduplication module 831. However, instead of the deduplication module 831, the third page data may be removed by the mapping module 833 described later in FIG. 14 below. In this case, the deduplication module 831 may transmit the third page data to the mapping module 833 together with the swap information of the third page data.

As another example, in (a) in FIG. 11, there are 12 original page data 1110 to be swapped out. Among the 12 original page data 1110, there are two page data duplicated with page data A, there are two page data duplicated with page data B, there are two page data duplicated with page data C, and there are two page data duplicated with page data D. Therefore, when deduplication is not performed as in the present invention, when the original page data 1110 is swapped out into the actual flash memory 820, a total of 12 writes must be performed.

However, as shown in (b) in FIG. 11, when performing deduplication on the original page data 1110, the number of writes of the deduplicated page data 1120 actually written in the flash memory 820 is 4. As a result, the lifespan of the flash memory 820 may be primarily increased by reducing the number of writes resulted from the swap-out.

Next, referring to FIGS. 12 and 13, a compression process of the page data to be swapped out of the compression module 832 will be described in detail.

Figure 12:
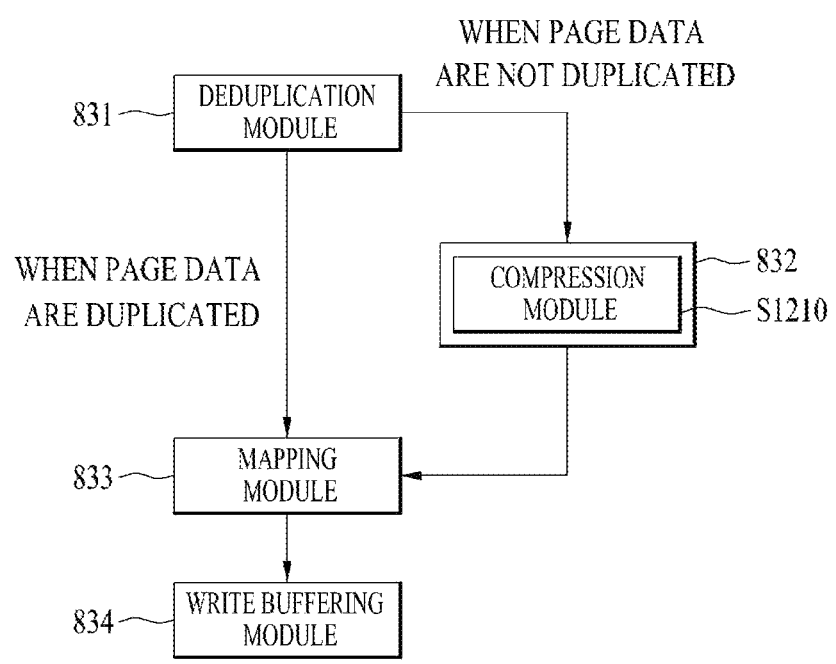
FIG. 12 is a flowchart showing an operation process of a compression module according to the present invention.

FIG. 12 is a flowchart showing an operation process of a compression module according to the present invention.

Figure 13A:
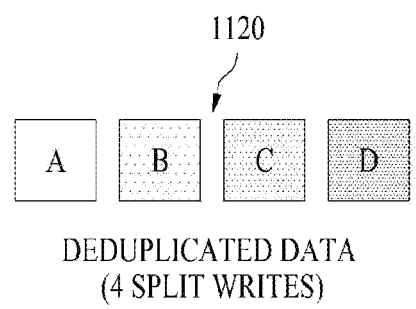
FIGS. 13(a) and 13(b) are explanatory diagrams illustrating a process of compressing deduplicated page data according to the present invention.
Figure 13B:
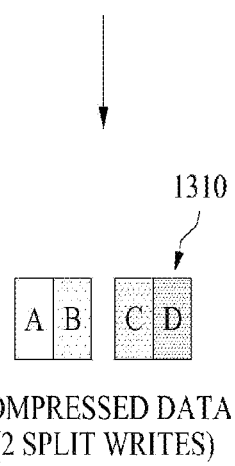

FIG. 13 is an explanatory diagram illustrating a process of compressing deduplicated page data according to the present invention.

Referring to FIGS. 12 and 13, when the first page data, second page data, and fourth page data that are not duplicated are received from the deduplication module 831, under the control of the controller 830, the compression module 832 sequentially compresses the received page data in a preset compression scheme, and transmits the compressed page data to the mapping module 833 [S1210].

In this connection, a compression function based on the preset compression scheme may use all existing compression functions such as an lz4, an lzma, and the like, and may use the original page data intactly without performing the compression when the compressed page data has a size greater than that of the original page data.

(a) in FIG. 13 illustrates deduplicated page data 1120. (b) in FIG. 13 illustrates page data 1310 formed by compressing the deduplicated page data 1120, which illustrates that the page data 1120 is compressed twice as much as the existing deduplicated page data 1120, and consequently the number of writes to the flash memory 820 is reduced to two from four before the compression.

As described above, the present invention may perform the compression on the deduplicated page data, so that the number of writes of the flash memory 820 may be secondarily reduced, thereby further increasing the lifespan.

Next, with reference to FIG. 14, an operation process of the mapping module 833 will be described in detail.

FIG. 14 is a flowchart showing an operation process of a mapping module according to the present invention.

Referring to FIG. 14, when the swap information for the duplicated third page data is received from the deduplication module 831, under the control of the controller 830, the mapping module 833 updates the received swap information in the mapping table 1000 in FIG. 10 [S1410].

More specifically, the received swap information may include the swap-offset value of the duplicated third page data and the first storage mapping data of the first page data having the hash value equal to the hash value of the duplicated third page data in the mapping table 1000 in FIG. 10. In addition, the first storage mapping data of the first page data may include at least one of the hash value, the storage location, the data size, and the number of duplicates of the first page data.

The mapping module 833 connects the swap-offset value 2 of the duplicated third page data with the first storage mapping data of the first page data having the hash value equal to the hash value A of the duplicated third page data, and increases the number of duplicates in the first storage mapping data of the first page data from existing "1" to "2" in the mapping table 1000 in FIG. 10.

That is, the duplicated third page data has the swap-offset value of "2", and the hash value A of the third page data is the same as the hash value A of the first page data, so that the mapping module 833 connects the swap-offset value 2 of the third page data with the storage mapping data [the hash value A, the storage location 1, and the data size 3] of the first page data, and changes the number of duplicates of the first page data from the existing "1" to "2".

In addition, when the compressed data are sequentially received from the compression module 832, under the control of the controller 830, the mapping module 833 sequentially generates storage mapping data for the sequentially received page data in the mapping table 1000 in FIG. 10, and then sequentially transmits the sequentially received page data back to the write buffering module 834 [S1420].

More specifically, as in the description of FIG. 10 above, the mapping module 833 allocates storage spaces respectively having the compressed sizes of the respective compressed first, second, and fourth page data respectively to the first, second, and fourth page data compressed in the flash memory 820 with reference with the mapping table 1000, generates each of the first, second, and fourth storage mapping data including the hash value of each of the first, second, and fourth page data, the location of each storage space allocated to each of the first, second, and fourth page data, the data size and the number of duplicates of each of the first, second, and fourth page data and records each of the first, second, and fourth storage mapping data in the mapping table 1000 in FIG. 10, and connects the swap-offset value of each of the compressed first, second, fourth page data with each of the first, second, and fourth storage mapping data that are generated.

For example, in FIG. 10, the first storage mapping data of the compressed first page data includes the hash value "A", the storage location "1", the data size "3", and the number of duplicates "2", and the swap-offset value of the first page data is connected to the first storage mapping data.

In addition, the second storage mapping data of the compressed second page data includes the hash value "B", the storage location "4", the data size "1", and the number of duplicates "0" (currently the second page data is not used in the RAM), and the swap-offset value of the second page data is connected to the second storage mapping data.

In addition, the compressed fourth storage mapping data of the fourth page data includes the hash value "C", the storage location "7", the data size "5", and the number of duplicates "1", and the swap-offset value of the fourth page data is connected to the fourth storage mapping data.

As described above, the mapping module 833 generates the first, second, and fourth storage mapping data respectively for the compressed first, second, and fourth page data and records the generated first, second, and fourth storage mapping data in the mapping table 1000, and sequentially transmits the compressed first, second, and fourth page data to the write buffering module 834 when the swap-offset value for the duplicated third page data is connected to the first storage mapping data of the first page data.

Next, with reference to FIGS. 15 and 16, a process of merging the compressed first, second, fourth page data and swapping the merged first, second, fourth page data out to the flash memory 820 by the write buffering module 834 will be described in detail.

Figure 15:
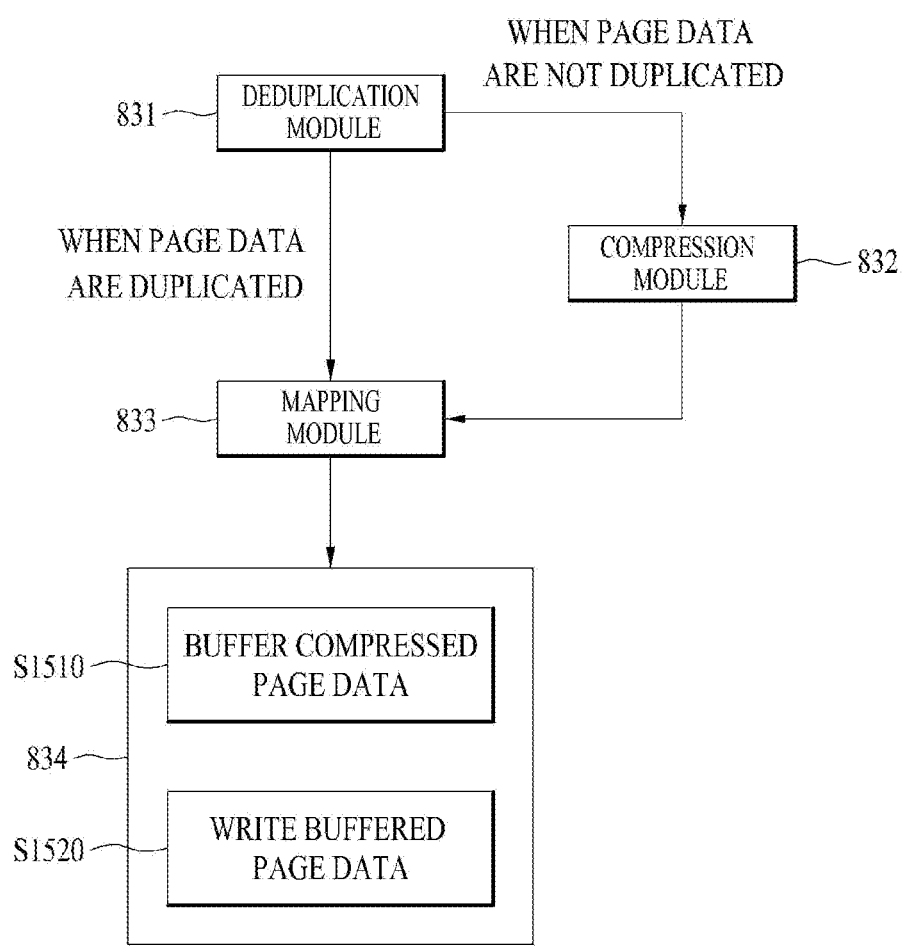
FIG. 15 is a flowchart showing an operation process of a write buffering module according to the present invention.

FIG. 15 is a flowchart showing an operation process of a write buffering module according to the present invention.

Figure 16A:
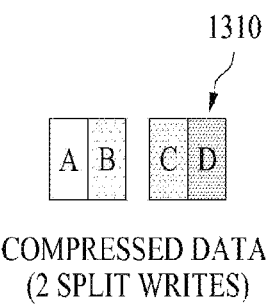
FIGS. 16(a) and 16(b) are explanatory diagrams illustrating a process of merging compressed page data and swapping the merged compressed page data out to a flash memory according to the present invention.
Figure 16B:
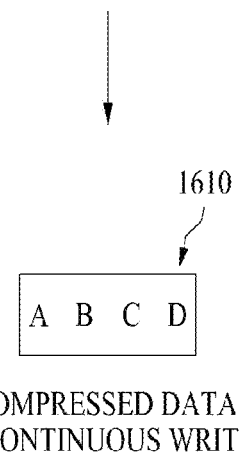

FIG. 16 is an explanatory diagram illustrating a process of merging compressed page data and swapping the merged compressed page data out to a flash memory according to the present invention.

Referring to FIGS. 15 and 16, under the control of the controller 830, the write buffering module 834 sequentially receives the compressed page data from the mapping module 833, and buffers and collects the page data in the RAM 810 until the total size of the received page data is equal to or greater than the minimum size capable of being input/output (i/o) into/from the flash memory 820 [S1510].

Further, the write buffering module 834 swaps the collected page data out to the flash memory 820 at one time based on the storage space locations in the flash memory 820 in the mapping table 1000 in FIG. 10 [S1520].

(a) in FIG. 16 shows page data 1310 compressed by the compression module 832. (b) in FIG. 16 shows that the page data 1310 are buffered in the RAM 810 until a total size of the compressed page data 1310 is equal to or greater than a minimum size capable of being input/output (i/o) in/from the flash memory 820, and then are written in the flash memory 820 at one time.

That is, the 12 original page data to be swapped out in FIG. 11 are left as 4 page data through the deduplication process according to the present invention, the number of writes to the flash memory 820 decreases from 12 to 4, the number of writes to the flash memory 820 decreases from 4 to 2 again through the compression process in FIG. 13, and the number of writes to the flash memory 820 decreases from 2 to 1 again through the buffering process in FIG. 16. Thus, the number of writes may be drastically reduced when swapping the page data out to the flash memory 820, so that the lifespan of the flash memory 820 may be increased consequently.

Next, a process of swapping the page data swapped to the flash memory 820 back into the RAM 810 will be described in detail with reference to FIG. 16.

Figure 17:
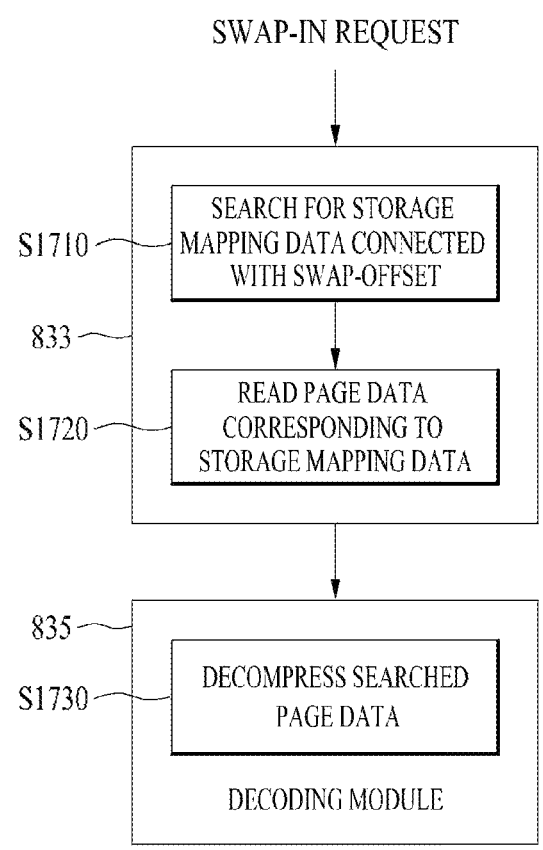
FIG. 17 is an explanatory diagram illustrated to describe an EFS swap-in process according to the present invention.

FIG. 17 is an explanatory diagram illustrated to describe an EFS swap-in process according to the present invention.

Referring to FIG. 17, when a swap-in request is received for the page data of the RAM 810 written in the flash memory 820 by the processes of FIGS. 8 to 16, the controller 730 searches for storage mapping data connected with swap-offset value of the page data requested to be swapped in in the mapping table 1000 through the mapping module 833 [S1710].

For example, in the description of FIGS. 10 and 14, the swap-offset values of the first, second, and fourth page data are respectively connected to the first, second, and fourth storage mapping data in the mapping table 1000, and the swap-offset value of the deduplicated third page data is connected to the first storage mapping data together with the first page data. In addition, the controller 830 searches for the first, second, and fourth storage mapping data as the storage mapping data respectively connected with the swap-offset values of the page data that are requested to be swapped in.

Next, the controller 830 searches for page data corresponding to the searched storage mapping data through the mapping module 833 [S1720].

That is, the controller 830 searches for storage space locations in the flash memory 820 and data sizes of the page data that are requested to be swapped in in the searched storage mapping data through the mapping module 833, and reads the page data respectively stored at the searched storage space locations [S1720].

In this connection, because the first page data that is not deduplicated and the third page data that is deduplicated are connected with each other in the first storage mapping data, in order to restore all the first to fourth page data, the controller 730 reads the first, second, and fourth page data respectively stored in the storage space locations of the first, second, and fourth storage mapping data through the mapping module 833, reads the first page data stored in the storage space location of the first storage mapping data once again, and then changes the first page data that is read once more to the deduplicated third page data.

Based on the above process, when the first to fourth page data that are firstly requested to be swapped out are read in the flash memory 820, the controller 830 decompresses the first to fourth page data through a decoding module 835 using the same algorithm as the scheme of compressing the first to fourth page data.

Further, the controller 730 performs final swap-in of the decompressed first to fourth page data respectively to the storage locations of the RAM 810 respectively corresponding to the swap-offset values of the first to fourth page data.

In this connection, the controller 830 may generate the third page data copied from the first page data when the first page data is decompressed without performing the above-described reading process of the third page data.

In addition, when at least one of the first to fourth page data is not compressed, the compression process may be omitted for the uncompressed page data.

Figure 18:
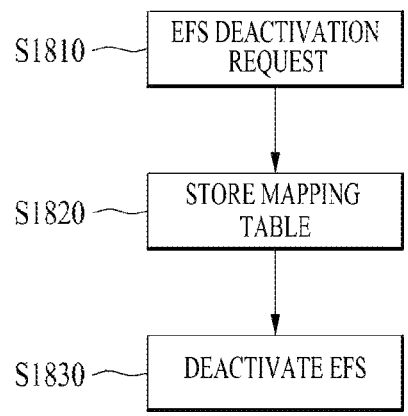
FIG. 18 is a flowchart showing a process of turning off an EFS swap function according to the present invention.
Figure 19:
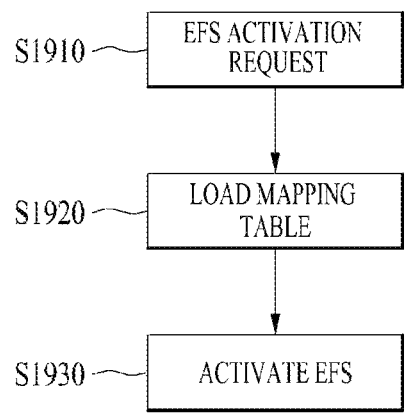
FIG. 19 is a flowchart showing a process of turning on an EFS swap function according to the present invention.

FIG. 18 is a flowchart showing a process of turning off an EFS swap function according to the present invention. Further, FIG. 19 is a flowchart showing a process of turning on an EFS swap function according to the present invention.

First, referring to FIG. 18, when a deactivation request of the EFS swap function is received [S1810], the controller 830 stores the mapping table 1000 in the RAM 810 such that the mapping table 1000 in which mapping operations of the page data are recorded may remain by the above described operations in FIGS. 8 to 17 even when the EFS swap function is deactivated [S1820].

Further, when the mapping table 1000 is stored in the RAM 810, the controller 830 may deactivate the EFS swap function [S1830].

In one example, the controller 830 may superfluously store the mapping table 1000 in the flash memory 820 such that the mapping table 1000 may be used when the EFS swap function is activated later even when the mapping table 1000 stored in the RAM 810 is damaged in the RAM 810.

In addition, before the digital device is turned off, the controller 830 may store the mapping table 1000 described by FIGS. 8 to 17 described above in the RAM 810, and turns off the digital device after the mapping table 1000 is stored in the RAM 820.

In addition, referring to FIG. 19, when an activation request of the EFS swap function is received [S1910], the controller 830 may load the mapping table 1000 stored in the RAM 810 by FIG. 187 [S1920], and may activate the EFS swap function based on the loaded mapping table 1000 [S1930].

In addition, referring to FIG. 19, the controller 830 may be activated when the digital device is powered on, may load the mapping table 1000 stored in the RAM 810, and may activate the EFS swap function based on the loaded mapping table 1000.

Hereinabove, the EFS swap function according to the present invention was described in detail with reference to FIGS. 8 to 19.

Hereinafter, with reference to FIGS. 20 to 26, an EFS Read-only function of preventing the write operation of the page data from the flash memory to the RAM depending on the state of the flash memory, and allowing only the read-only operation for the page data stored (or written) in the swap space of the flash memory will be described in detail.

Figure 20:
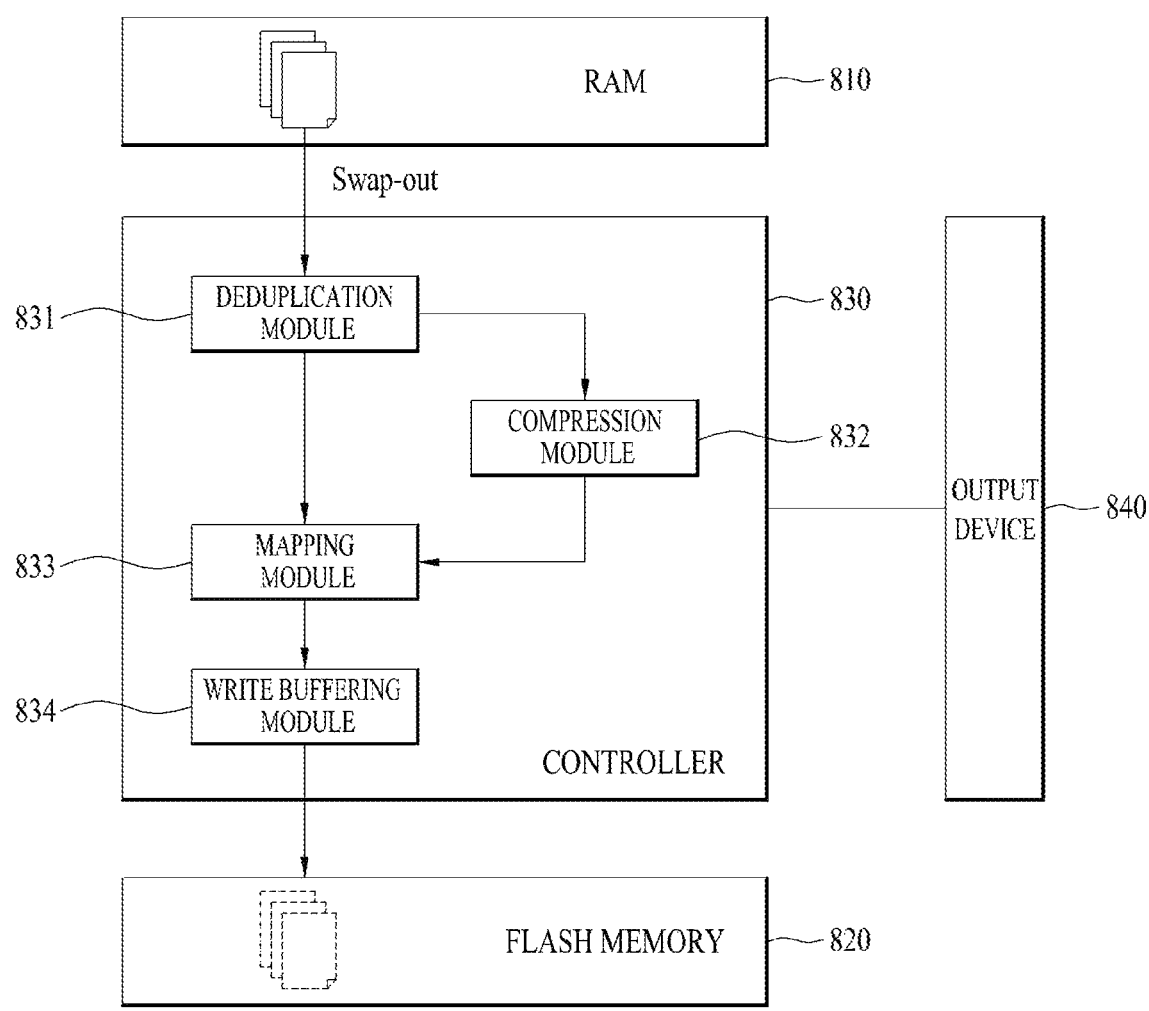
FIG. 20 is a block diagram of a digital device performing an EFS Read-only operation according to the present invention.

FIG. 20 is a block diagram of a digital device performing an EFS Read-only operation according to the present invention.

Figure 21:
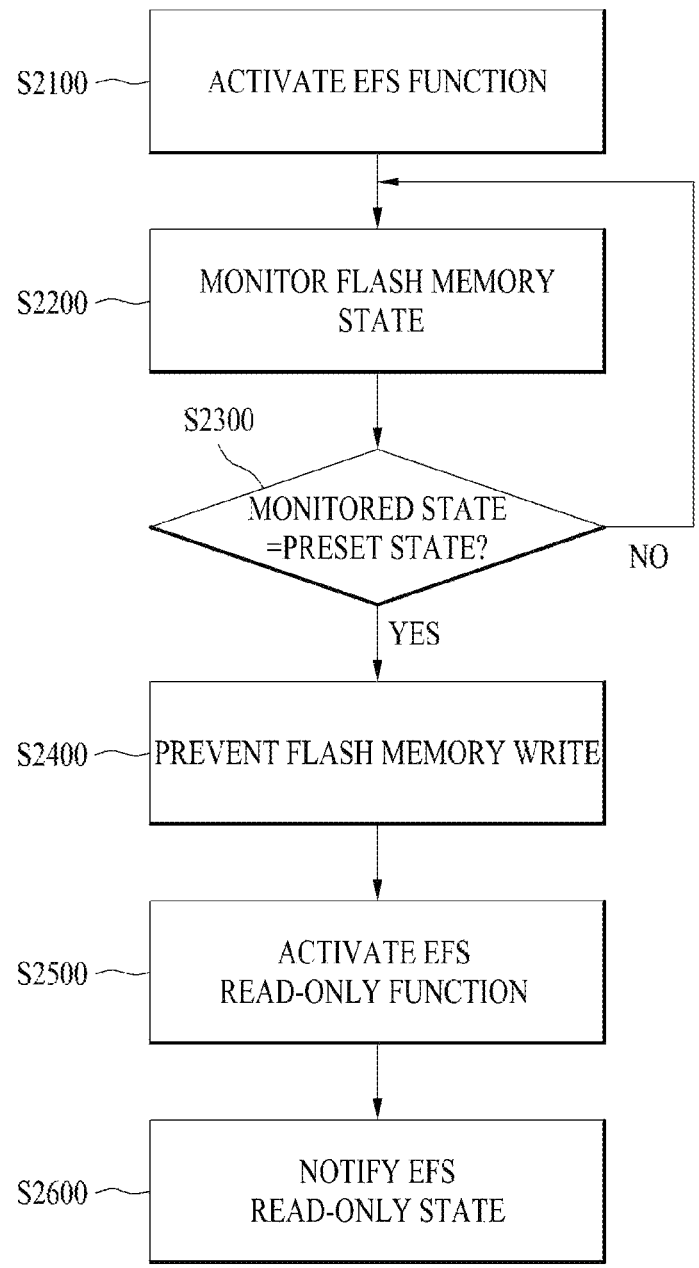
FIG. 21 is a flowchart showing a process of performing an EFS Read-only operation according to the present invention.

FIG. 21 is a flowchart showing a process of performing an EFS Read-only operation according to the present invention.

First, referring to FIGS. 20 and 21, when the EFS function described in FIGS. 8 to 19 described above is activated [S2100], the controller 830 monitors the state of the flash memory 820 while the EFS function is activated, that is, while the page data of the RAM 810 is deduplicated, swapped out, and written in the flash memory 820 [S2200].

Further, when the flash memory 820 corresponds to a preset state [S2300], the controller 830 determines that a problem has occurred or is likely to occur in the lifespan reliability of the flash memory 820, prevents the write operation of the page data of the RAM 810 to the flash memory 820 [S2400], and activates the EFS Read-only function that allows only the read-only for the page data stored (or written) in the swap space of the flash memory 820 [S2500].

Further, the controller 830 outputs, through an output device 840, at least one of a visual notification and an auditory notification indicating that the EFS Read-only function is activated [S2600].

In this connection, the output device 840 may include a display for displaying the visual notification, and the display may include one of the display 330 in FIG. 3, the display 451 in FIG. 4, and the display 661 in FIG. 6.

In addition, the output device 840 may include an audio output device that outputs the auditory notification in a state of an audible sound. The audio output device may include one of the audio output device 335 in FIG. 3, the audio output module 452 in FIG. 4, and the audio output device 662 in FIG. 6.

Hereinafter, a process in which the EFS Read-only function is activated based on various states of the flash memory 820 will be described in detail with reference to FIGS. 22 to 25.

Figure 22:
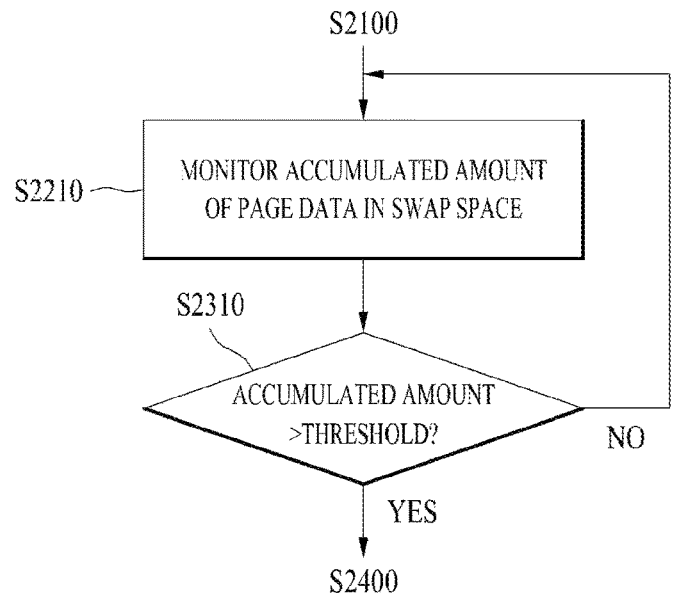
FIG. 22 is an embodiment flowchart showing a process in which an EFS Read-only function is activated according to the present invention.

FIG. 22 is an embodiment flowchart showing a process in which an EFS Read-only function is activated according to the present invention.

Referring to FIG. 22, the controller 830 may activate the EFS Read-only function based on an accumulated amount of page data written in the swap space of the flash memory 820.

That is, the controller 830 monitors the accumulated amount of page data written in the flash memory 820 for a preset period after the EFS function is activated [S2210]. When the accumulated amount of page data is equal to or greater than the preset accumulated amount [S2310], the controller 830 determines that the problem in the lifespan reliability of the flash memory 820 is likely to occur because a partition capacity corresponding to the swap space allocated in the flash memory 820 is full, prevents the write operation of the page data of the RAM 810 to the flash memory 820, and activates the EFS Read-only function is activated.

In this connection, when the accumulated amount of page data is equal to or greater than the preset accumulated amount, the controller 830 may predict an actual lifespan of the flash memory 820 using a following equation, and activate the EFS Read-only function when the expected lifespan exceeds a preset target lifespan.

Calculation formula of expected lifespan of flash memory $$\text{Expected lifespan} = (\text{total memory capacity} \times 3000 \text{ times})/(365 \text{ days} \times \text{daily write amount} \times \text{WAF})$$

WAF: Write Amplification Factor

Figure 23:
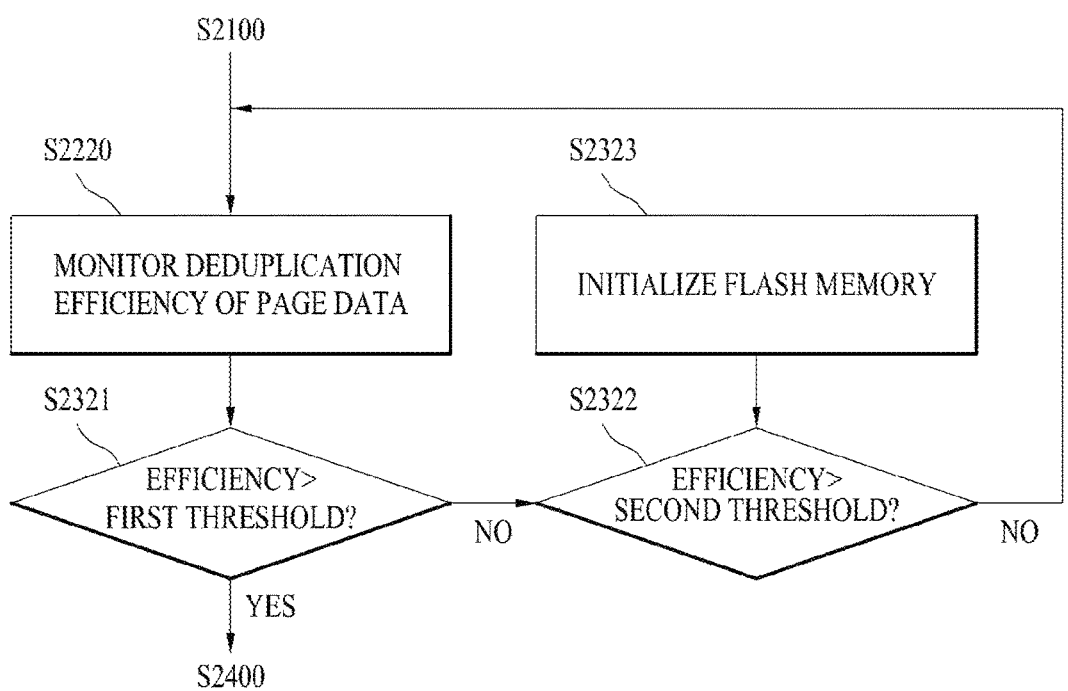
FIG. 23 is another embodiment flowchart showing a process in which an EFS Read-only function is activated according to the present invention.

Next, FIG. 23 is another embodiment flowchart showing a process in which an EFS Read-only function is activated according to the present invention.

Referring to FIG. 23, the controller 830 may activate the EFS Read-only function based on a deduplication efficiency of the page data deduplicated by the processes of FIGS. 8 to 19 described above and swapped out to the flash memory 820.

In this connection, the higher the deduplication efficiency, the fewer the number of page data written in the flash memory 820. Further, the lower the deduplication efficiency, the greater the number of page data written in the flash memory 820. As a result, as shown in FIG. 22, the accumulated amount of page data written in the swap space of the flash memory 820 becomes full, which may cause the problem in the lifespan reliability of the flash memory 820.

As an example, the more storage mapping data for the page data with the number of duplicates or with a large number of duplicates in the mapping table in FIG. 10 is recorded, the higher the deduplication efficiency is.

The controller 830 monitors the deduplication efficiency for the page data that is swapped out from the RAM 810 to the flash memory 820 for the preset period after the EFS function is activated [S2220]. When the monitored deduplication efficiency is higher than a preset first efficiency [S2321], the controller 830 determines that the page data currently written in flash memory 820 is optimized for the deduplication, prevents the write operation of the page data of the RAM 810 to the flash memory 820, and activates the EFS Read-only function.

On the other hand, when the monitored deduplication efficiency is lower than the first efficiency and a preset second efficiency [S2322], the controller 830 may determine that the EFS deduplication function does not play a role because there is no or almost no record of the storage mapping data of the page data in the mapping table in FIG. 10, format the page data stored in the flash memory 820 and initialize the flash memory 820 [S2323], or entirely deactivate the EFS function.

Figure 24:
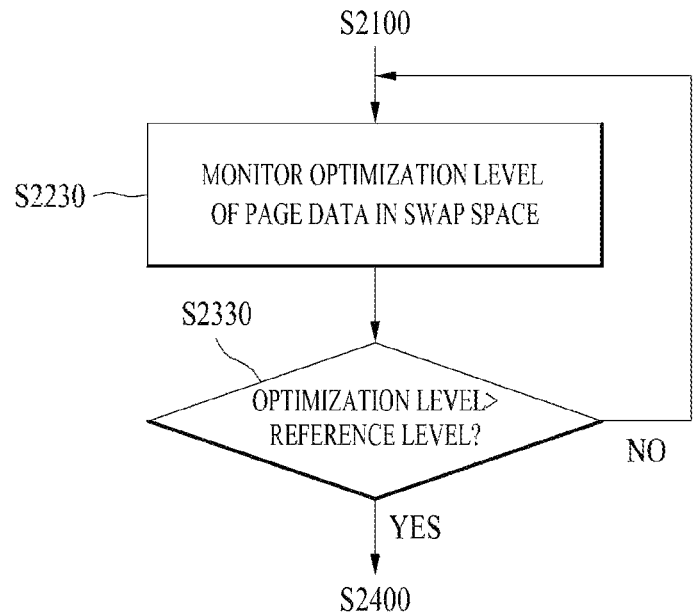
FIG. 24 is another embodiment flowchart showing a process in which an EFS Read-only function is activated according to the present invention.

Next, FIG. 24 is another embodiment flowchart showing a process in which an EFS Read-only function is activated according to the present invention.

Referring to FIG. 24, the controller 830 monitors whether the page data written in the swap space of the flash memory 820 is currently being executed or is optimized at a level equal to higher than a preset level with data of a specific associated application [S2230]. When the page data is optimized at the level equal to or higher than the preset level with the data of the specific application [S2330], the controller 830 prevents the write operation of the page data of the RAM 810 to the flash memory 820 and activates the EFS Read-only function.

Figure 25:
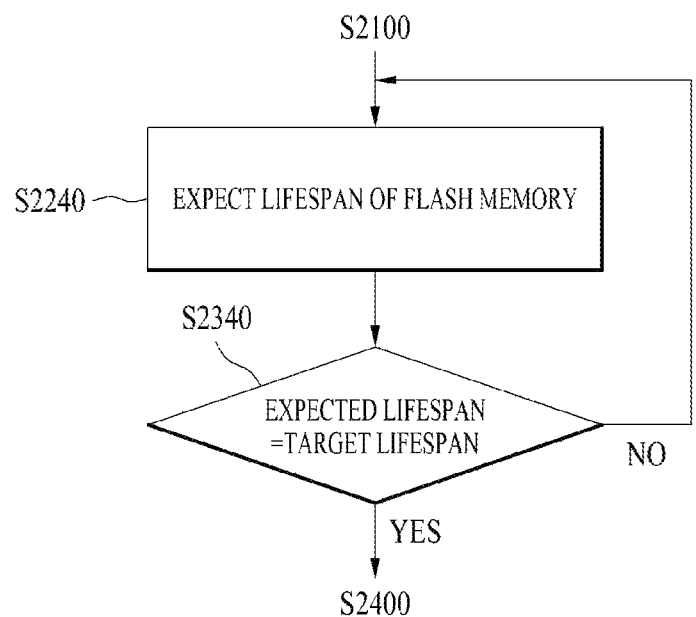
FIG. 25 is another embodiment flowchart showing a process in which an EFS Read-only function is activated according to the present invention.

Next, FIG. 25 is another embodiment flowchart showing a process in which an EFS Read-only function is activated according to the present invention.

Referring to FIG. 25, the controller 830 expects the lifespan of the flash memory 820 in which the page data are written using the expected lifespan calculation formula described above [S2240]. When the expected lifespan of the flash memory 820 has reached the preset target lifespan [S2340], the controller 830 determines that the problem is likely to occur in the lifespan reliability of the flash memory 820 because the partition space corresponding to the swap space allocated in the flash memory 820 is full, prevents the write operation of the page data of the RAM 810 to the flash memory 820, and activates the EFS Read-only function.

In addition, when it is determined that the expected lifespan of the flash memory 820 has reached the target lifespan based on a usage pattern of the user for the flash memory 820 during the preset period, the controller 830 may prevent the write operation of the page data of the RAM 810 to the flash memory 820 and activate the EFS Read-only function.

Figure 26:
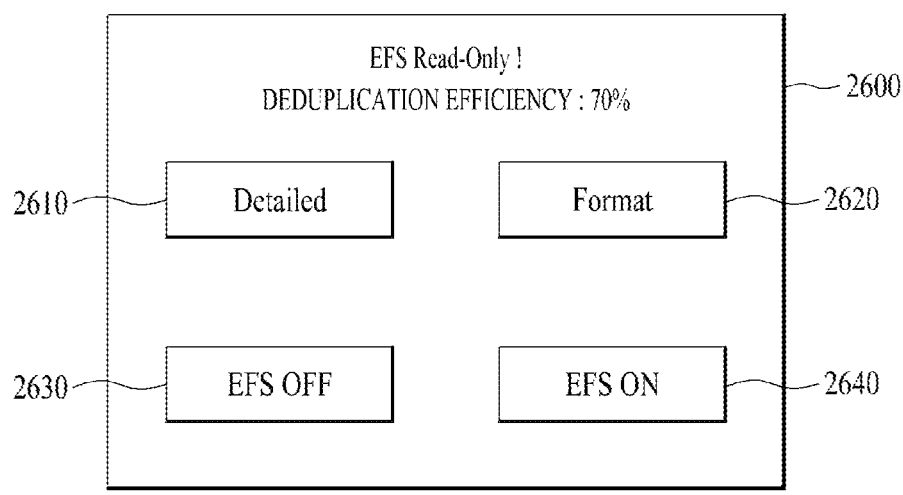
FIG. 26 is an explanatory diagram illustrating a process of informing a user that an EFS Read-only function is activated according to the present invention.

Next, FIG. 26 is an explanatory diagram illustrating a process of informing a user that an EFS Read-only function is activated according to the present invention.

Referring to FIG. 26, when the EFS Read-only function is activated, the controller 830 may display a notification screen 2600 indicating that the EFS Read-only function is activated on the display included in the output device 840.

In this connection, the controller 830 may display the notification screen 2600 at the same time when the EFS Read-only function is activated, and may display the notification screen 2600 when a setting menu for displaying the notification screen 2600 is selected.

In addition, in the notification screen 2600, information indicating the deduplication efficiency (70%) described in FIG. 23 may be included.

In addition, a first icon 2610 for displaying detailed information 2610 indicating the reason why the EFS Read-only is activated is included in the notification screen 2600. When the first icon 2610 is selected, the detailed information may be displayed in the notification screen 2600. In addition, the reason may correspond to one of situations in FIGS. 22 to 25 described above.

In addition, a second icon 2620 for formatting the flash memory 820 in which the page data are written is included in the notification screen 2600. When the second icon 2620 is selected, the flash memory 820 may be formatted and the page data may be deleted.

In addition, a third icon 2630 for deactivating the activated EFS Read-only function and a third icon 2640 for activating the deactivated EFS Read-only function again may be included in the notification screen 2600.

Figure 27:
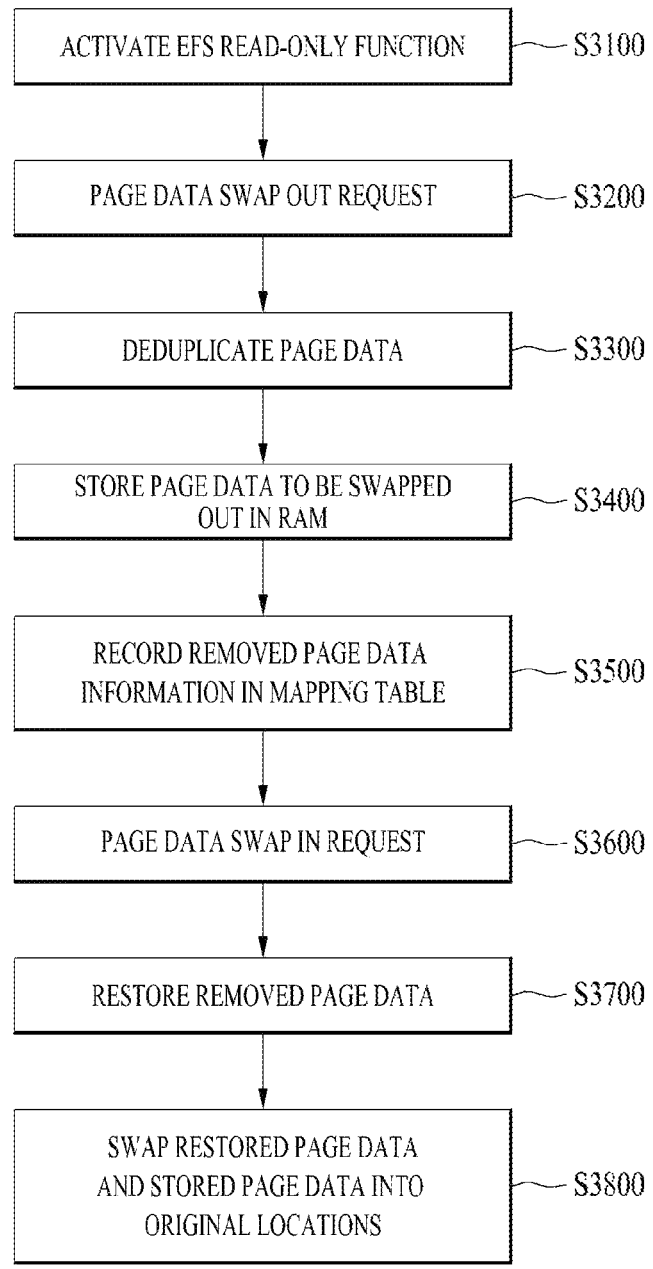
FIG. 27 is a flowchart showing swap-out and swap-in operations after an EFS Read-only function is activated according to the present invention.

Next, FIG. 27 is a flowchart showing swap-out and swap-in operations after an EFS Read-only function is activated according to the present invention.

Referring to FIG. 27, in a state in which the EFS Read-only function is activated by the processes of FIGS. 20 to 25 described above [S3100], when EFS swap-out of the page data in the RAM 810 is requested [S3200], the controller 830 performs a deduplication operation on the page data that are requested to be swapped out [S3300].

In detail, the controller 830 stores only one of two or more page data whose contents are duplicated among the page data that are requested to be swapped out as a representative in a preset storage space in the RAM 810 [S3400], removes the remaining at least one page data with the duplicated content, records swap information (storage mapping data) for the removed at least one page data in the mapping table in FIG. 10 stored in the RAM 810 [S3500].

That is, in FIG. 27, when the EFS Read-only function is activated, the write of the page data to the flash memory 820 is prevented. Thus, the page data to be swapped out is not stored in the flash memory 820 like the EFS function, but is stored and kept in the separately allocated storage space in the RAM 810. The swap-out operation in the rest of the EFS Read-only function except the storage operation is the same as the swap-out operation of the EFS function.

In addition, when swap-in of the page data is requested in a state in which the EFS Read-only function is activated [S3600], the controller 830 restores the removed at least one page data based on the swap information recorded in the mapping table in FIG. 10 [S3700], and swaps the page data stored and kept in the preset storage space of the RAM 810 and the restored at least one page data into original locations thereof of the RAM 810 [S3800]. The restoration operation of the removed page data is the same as the restoration operation of the removed page data of the EFS function.

The configuration and the method of the embodiments described above may not be limitedly applied to the digital device and the method for controlling the digital device disclosed herein. The embodiments may be configured by selectively combining all or some of the embodiments such that various modifications may be made.

In one example, the method for controlling the digital device disclosed herein may be implemented as a code readable by a processor in a record medium readable by the processor provided in the digital device. The record medium readable by the processor includes all types of record devices in which data that may be read by the processor are stored. Examples of the record media that may be read by the processor include a ROM, a RAM, a CD-ROM, a magnetic tape, a floppy disk, an optical data storage device, and the like, and also include those implemented in a form of a carrier-wave such as transmission over Internet and the like. In addition, the record medium that may be read by the processor may be distributed in a computer system connected through a network, so that the code readable by the processor may be stored and executed in a distributed manner.

In one example, in the present specification, the present invention is described with reference to the accompanying drawings, but is only an embodiment, and the present invention is not limited to a specific embodiment. Further, various contents that may be modified by those skilled in the art to which the present invention pertains also belong to the scope of the claims. In addition, such modifications should not be individually understood from the technical idea of the present invention.

What is claimed is:

1. A digital device, comprising:
   a first memory;
   a second memory used as a swap space for page data in the first memory; and
   a controller configured to:
      control the page data to be swapped out and written in the second memory; and
      control the page data written in the second memory to be swapped into the first memory,
   wherein the controller is configured to:
      prevent a write operation of the page data into the second memory, based on a state of the second memory associated with writing the page data; and
      allow a read-only operation of the page data written in the second memory, and
   wherein the controller is further configured to:
      control only one of a plurality of page data whose contents are duplicated, among the page data to be swapped out, to be swapped out as a representative and written in the second memory when swapping out the page data; and
      control the rest of the plurality of page data whose contents are duplicated to be removed from the first memory without being swapped out to the second memory.

2. The digital device of claim 1, wherein the controller is configured to:
   calculate respective hash values of the page data to be swapped out for distinguishing respective contents of the page data to be swapped out from each other; and
   determine that contents of page data having a same hash value among the calculated hash values are the same.

3. The digital device of claim 1, wherein the controller is configured to:
   store swap information for the removed at least one page data in the first memory;
   restore the removed at least one page data based on the stored swap information when swapping the page data swapped out to the second memory into the first memory; and
   swap the page data swapped out to the second memory and the restored at least one page data into the first memory.

4. The digital device of claim 3, wherein the first memory includes a mapping table, and
   wherein the controller is configured to:
      sequentially map each hash value of each of the page data to be swapped out and each storage location in the first memory of the page data to be swapped out into the second memory with each swap-offset value of each of the page data to be swapped out, thereby to create the mapping table;
      determine that contents of first and second page data are duplicated when a hash value of the first page data is the same as a hash value of the second page data already recorded in the mapping table while mapping each hash value and each storage location with each swap-offset value; and
      connect a swap-offset value of the first page data to a storage location of the second page data in the mapping table and remove the first page data.

5. The digital device of claim 4, wherein the swap information includes the storage location of the second page data connected to the swap-offset value of the first page data, and
   wherein the controller is configured to:
      search for the storage location of the second page data connected to the swap-offset value of the first page data in the mapping table when swapping the removed first page data into the first memory; and
      change the second page data stored at the searched storage location to the first page data and swap the first page data into the first memory.

6. The digital device of claim 4, wherein the controller is configured to:
   sequentially compress page data whose contents are not duplicated among the page data to be swapped out in a preset compression scheme;
   allocate, into the second memory, each storage space having a compressed size of each of the page data whose contents are not duplicated with reference to the mapping table; and
   connect a location of each allocated storage space to each swap-offset value and each hash value of each of the page data whose contents are not duplicated.

7. The digital device of claim 6, wherein the controller is configured to:
   buffer until a total size of the sequentially compressed page data becomes a minimum size capable of being input/output into/from the second memory; and
   control the buffered page data to be swapped out and written in the second memory when the total size of the page data becomes the minimum size capable of being input/output into/from the second memory.

8. The digital device of claim 1, further comprising an output device for outputting at least one of a visual notification and an auditory notification,
   wherein the controller is configured to output at least one of a visual notification and an auditory notification indicating the read-only operation through the output device.

9. The digital device of claim 1, wherein the controller is configured to:
   store only one of the plurality of page data whose contents are duplicated in a preset storage space in the first memory as the representative when a swap-out of the page data in first memory is requested while the read-only operation is being performed; and control the rest of the plurality of page data whose content are duplicated to be removed without being stored in the preset storage space.

10. The digital device of claim 9, wherein the controller is configured to:
store swap information for the removed rest of the plurality of page data in the first memory;
restore the removed rest of the plurality of page data based on the stored swap information when a swap-in of the page data is requested while the read-only operation is being performed; and
swap the page data stored in the preset storage space of the first memory and the restored rest of the plurality of page data into original locations thereof in the first memory.

11. The digital device of claim 1, wherein the controller is configured to allow only the read-only operation for the page data written in the second memory when an accumulated amount of page data written in the second memory is greater than a threshold.

12. The digital device of claim 1, wherein the controller is configured to allow only the read-only operation for the page data written in the second memory when a deduplication efficiency for the page data is greater than a threshold.

13. The digital device of claim 1, wherein the controller is configured to delete the page data written in the second memory and initialize the second memory when an efficiency of deduplication for page data requested to be swapped out to the second memory is less than a threshold.

14. The digital device of claim 1, wherein the controller is configured to allow only the read-only operation for the page data written in the second memory when the page data written in the second memory is optimized at a level equal to higher than a preset level with data of a specific application.

15. The digital device of claim 1, wherein the controller is configured to allow only the read-only operation for the page data written in the second memory when an expected lifespan of the second memory has reached a target lifespan.

16. The digital device of claim 15, wherein the controller is configured to allow only the read-only operation for the page data written in the second memory when it is determined that the expected lifespan of the second memory has reached the target lifespan based on a usage pattern of the second memory for a preset period.

17. A method for controlling a digital device including a first memory and a second memory used as a swap space of page data stored in the first memory, the method comprising:
swapping the page data out and writing the page data in the second memory when a swap-out request for storing the page data in the first memory into the second memory is received;
swapping the page data written in the second memory into the first memory when a swap-in request of the page data written in the second memory is received; and
preventing a write operation of the page data into the second memory and allowing a read-only operation of the page data written in the second memory, based on a state of the second memory associated with write of the page data,
wherein the method further comprises:
swapping out only one of a plurality of page data whose contents are duplicated, among the page data, as a representative and writing the only one of the plurality of page data in the second memory when the page data are swapped out; and
removing the rest of the plurality of page data whose contents are duplicated from the first memory without swapping out the rest of the plurality of page data to the second memory.

18. The method of claim 17, further comprising:
storing only one of the plurality of page data whose contents are duplicated in a preset storage space in the first memory as the representative when a swap-out of the page data in first memory is requested while the read-only operation is being performed; and
removing the rest of the plurality of page data whose contents are duplicated without storing the rest of the plurality of page data in the preset storage space.

19. The method of claim 17, further comprising:
calculating respective hash values of the page data to be swapped out for distinguishing respective contents of the page data to be swapped out from each other; and
determining that contents of page data having a same hash value among the calculated hash values are the same.

20. The method of claim 17, further comprising:
storing swap information for the removed at least one page data in the first memory;
restoring the removed at least one page data based on the stored swap information when swapping the page data swapped out to the second memory into the first memory; and
swapping the page data swapped out to the second memory and the restored at least one page data into the first memory.

* * * * *